(12) United States Patent
Fudaba et al.

(10) Patent No.: US 9,415,516 B2
(45) Date of Patent: Aug. 16, 2016

(54) CONTROL APPARATUS AND CONTROL METHOD FOR MASTER SLAVE ROBOT, ROBOT, CONTROL PROGRAM FOR MASTER SLAVE ROBOT, AND INTEGRATED ELECTRONIC CIRCUIT FOR CONTROL OF MASTER SLAVE ROBOT

(71) Applicant: Panasonic Corporation, Osaka (JP)

(72) Inventors: Yudai Fudaba, Osaka (JP); Yuko Tsusaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/307,683

(22) Filed: Jun. 18, 2014

(65) Prior Publication Data

US 2014/0379132 A1    Dec. 25, 2014

(30) Foreign Application Priority Data

Jun. 24, 2013   (JP) ................................. 2013-131632

(51) Int. Cl.
*B25J 9/16* (2006.01)

(52) U.S. Cl.
CPC ..... *B25J 9/1689* (2013.01); *G05B 2219/40139* (2013.01); *G05B 2219/40405* (2013.01); *Y10S 901/02* (2013.01)

(58) Field of Classification Search
CPC .. B25J 3/00; B25J 9/1689; A61B 2019/2223; A61B 2019/5297; A61B 2019/5295; A61B 2019/5291; A61B 8/461; A61B 8/462; A61B 8/463; A61B 8/464; A61B 8/465; A61B 8/466; A61B 6/461; A61B 6/462; A61B 6/463; A61B 6/464; A61B 6/465; A61B 6/466; A61B 1/00045; A61B 3/0041; A61B 5/742; A61B 5/7425; A61B 5/743; A61B 5/7435; A61B 5/744; A61B 5/7445; A61B 5/745; A61B 34/25; A61B 34/30; A61B 34/70; A61B 2034/254; A61B 34/35; A61B 34/37; A61B 34/74; A61B 34/76; Y10S 901/02; G05B 2219/40139; G05B 2219/40405
USPC .............................. 382/153; 700/3, 260, 264
See application file for complete search history.

(56) References Cited

U.S. PATENT DOCUMENTS

| | | | |
|---|---|---|---|
| 4,853,874 A | 8/1989 | Iwamoto et al. | |
| 5,808,665 A * | 9/1998 | Green ........................ | B25J 3/04 348/65 |
| 6,084,371 A * | 7/2000 | Kress ..................... | B25J 9/1689 318/566 |
| 6,424,885 B1 * | 7/2002 | Niemeyer ..................... | 600/109 |
| 2004/0116906 A1 * | 6/2004 | Lipow .............................. | 606/1 |
| 2007/0083098 A1 * | 4/2007 | Stern .................. | A61B 1/00188 600/407 |
| 2013/0289767 A1 * | 10/2013 | Lim ....................... | B25J 9/1633 700/253 |

FOREIGN PATENT DOCUMENTS

| | | |
|---|---|---|
| JP | 60-123285 | 7/1985 |
| JP | 63-150172 | 6/1988 |
| JP | 8-187246 | 7/1996 |
| JP | 8-318479 | 12/1996 |
| JP | 9-136277 | 5/1997 |

* cited by examiner

*Primary Examiner* — Stephen Holwerda
(74) *Attorney, Agent, or Firm* — Wenderoth, Lind & Ponack, L.L.P.

(57) ABSTRACT

A force information correcting unit generates force information in accordance with magnification percentage information acquired by a display information acquiring unit. The force information matches a picture watched by an operator to manipulation of the operator with no sense of incongruity. A force information presentation unit presents the generated force information to the operator, so that work efficiency is improved.

16 Claims, 35 Drawing Sheets

Fig.5

| TIME (msec) | POSITION (mm) (x, y, z) | ORIENTATION (rad) ($r_x, r_y, r_z$) | VELOCITY (mm/msec) ($v_x, v_y, v_z$) | ANGULAR VELOCITY (rad/msec) ($\omega_x, \omega_y, \omega_z$) |
|---|---|---|---|---|
| ... | ... | ... | ... | ... |
| 1821 | 112.2, 65.5, −8.5 | 0.07, −0.87, 1.22 | 0.11, −0.21, 0.38 | 0.015, −0.012, 0.010 |
| 1822 | 113.1, 64.8, −8.5 | 0.06, −0.85, 1.27 | 0.95, −0.73, 0.00 | −0.018, 0.022, 0.059 |
| 1823 | 113.5, 64.0, −8.0 | 0.05, −0.82, 1.28 | 0.42, −0.82, 0.50 | −0.010, 0.026, 0.017 |
| ... | ... | ... | ... | ... |

Fig.9

| TIME (msec) | MAGNIFICATION PERCENTAGE | POSITION (mm) (x, y, z) | ORIENTATION (rad) ($r_x, r_y, r_z$) |
|---|---|---|---|
| ⋮ | ⋮ | ⋮ | ⋮ |
| ⋮ | ⋮ | ⋮ | ⋮ |
| 2244 | 4.0 | 180.0, 25.5, −18.5 | 0.12, −0.55, 1.01 |
| 2245 | 4.0 | 180.4, 25.5, −18.5 | 0.11, −0.53, 1.01 |
| 2246 | 4.0 | 180.4, 25.2, −18.0 | 0.10, −0.52, 1.03 |
| ⋮ | ⋮ | ⋮ | ⋮ |
| ⋮ | ⋮ | ⋮ | ⋮ |

| TIME (msec) | MAGNIFICATION PERCENTAGE | POSITION (mm) (x, y, z) | ORIENTATION (rad) ($r_x, r_y, r_z$) |
|---|---|---|---|
| ⋮ | ⋮ | ⋮ | ⋮ |
| 5544 | 1.5 | 70.0, 25.5, −18.5 | 0.32, −0.35, 1.01 |
| 5545 | 1.5 | 72.4, 22.5, −21.5 | 0.31, −0.33, 1.10 |
| 5546 | 4.0 | 73.4, 22.2, −21.0 | 0.30, −0.32, 1.11 |
| ⋮ | ⋮ | ⋮ | ⋮ |

Fig.12

| TIME (msec) | POSITION (mm) (x, y, z) | ORIENTATION (rad) ($r_x, r_y, r_z$) |
|---|---|---|
| ⋮ | ⋮ | ⋮ |
| 356 | 0.11, −0.21, 0.00 | 0.015, −0.012, 0.010 |
| 357 | 0.21, −0.20, 0.03 | 0.015, −0.022, 0.010 |
| 358 | 0.33, −0.21, 0.10 | 0.015, −0.026, 0.015 |
| ⋮ | ⋮ | ⋮ |

| TIME (ms) | FORCE (N or Nm) <br> ($F_x, F_y, F_z,$ <br> $M_x, M_y, M_z$) |
|---|---|
| ⋮ | ⋮ |
| 2005 | 0.55, 1.22, −2.11, <br> 0.012, 0.021, 0.031 |
| 2006 | 0.57, 1.25, −2.20, <br> 0.012, 0.022, 0.034 |
| 2007 | 0.55, 1.27, −2.30, <br> 0.013, 0.021, 0.033 |
| ⋮ | ⋮ |

CONTROL APPARATUS AND CONTROL METHOD FOR MASTER SLAVE ROBOT, ROBOT, CONTROL PROGRAM FOR MASTER SLAVE ROBOT, AND INTEGRATED ELECTRONIC CIRCUIT FOR CONTROL OF MASTER SLAVE ROBOT

TECHNICAL FIELD

The technical field relates to a control apparatus and a control method for a master slave robot, a robot, a control program for the master slave robot, and an integrated electronic circuit for control of the master slave robot, in each of which motion of the master slave robot is generated.

BACKGROUND ART

A master slave robot has been attracting attention in various fields. Such a master slave robot includes a master robot that is manipulated remotely by a person and a slave robot that performs a task.

In endoscopic surgery at a medical site, a surgeon remotely manipulates a master robot while being watching an endoscope motion picture projected on a monitor screen and moves a forceps gripped by a slave robot to conduct the surgery. There is an effect that the surgery can be conducted while an enlarged picture of an affected part or the forceps being projected on the monitor screen as well as an effect that the surgery can be conducted remotely by an expert surgeon who is not at the site.

There has been also proposed a master slave robot for a manufacturing site, and such a master slave robot includes a slave robot that is remotely manipulated or taught to perform a detailed task or a skilled task. The master slave robot is capable of easily performing a detailed task particularly under a microscope thanks to enlarged display around a hand, enlargement or reduction in shift amount of hand manipulation, or the like.

Both of these master slave systems are required to have a function of smoothly manipulating the slave robot in accordance with the manipulated master robot, as well as a function of feeding back force applied to the slave robot to the master robot.

A person manipulates the master robot while watching the monitor screen. There has been thus proposed the following technique that matches a motion picture on the monitor to manipulation of the master robot or motion of the slave robot with no sense of incongruity.

A master slave manipulator for body cavity surgery automatically adjusts a motion ratio between a master robot and a slave robot in accordance with a magnification percentage of a motion picture projected on a monitor (see Patent Literature 1).

CITATION LIST

Patent Literature

[Patent Literature 1] JP 8-187246 A

SUMMARY OF THE INVENTION

More improvement in maneuverability has been demanded so that a picture watched by an operator is matched to manipulation of the operator with a less sense of incongruity.

One non-limiting and exemplary embodiment provides a control apparatus and a control method for a master slave robot, a robot, a control program for the master slave robot, and an integrated electronic circuit for control of the master slave robot, in each of which the master slave robot is manipulated by an operator who is watching a motion picture, and matches the picture watched by the operator to manipulation of the operator with no sense of incongruity.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: A control apparatus for a master slave robot that comprises a slave arm that performs a task to a soft object and a master arm manipulated by a person who remotely manipulates the slave arm, the person performing the task using the master slave robot while watching a state of the task imaged by an imaging device and displayed on a display unit, the control apparatus comprising:

a force information acquiring unit that acquires information on force externally applied to the slave arm;

a display information acquiring unit that acquires magnification percentage information at the display unit that displays the task;

a force information correcting unit that corrects the force information acquired from the force information acquiring unit to be smaller as the magnification percentage information acquired from the display information acquiring unit is larger, to generate corrected force information; and a force information presentation unit that presents, to the master arm, the corrected force information generated by the force information correcting unit.

These general and specific aspects may be implemented using a system, a method, and a computer program, and any combination of systems, methods, and computer programs.

According to the aspect of the present invention, it is possible to present force corresponding to manipulation of the operator (person) and the motion picture watched by the operator, so that the picture watched by the operator can be matched to the manipulation of the operator with a less sense of incongruity. This allows the task to be performed accurately.

BRIEF DESCRIPTION OF THE DRAWINGS

These and other aspects and features of the present disclosure will become clear from the following description taken in conjunction with the embodiments thereof with reference to the accompanying drawings, in which:

FIG. 5 is a data chart of motion information and time information on the master slave robot according to the first embodiment of the present invention;

FIG. 9 is a data chart of magnification percentage information, imaging device position information, and time information on the master slave robot according to the first embodiment of the present invention;

FIG. 12 is a data chart of corrected master motion information and time information on the master slave robot according to the first embodiment of the present invention;

DETAILED DESCRIPTION

Embodiments of the present invention are detailed below with reference to the drawings.

Prior to the detailed description of the embodiments of the present invention with reference to the drawings, finding a configuring basis of the present invention is described initially and various aspects of the present invention are described subsequently.

(Finding Configuring Basis of the Present Invention)

Figure 1:
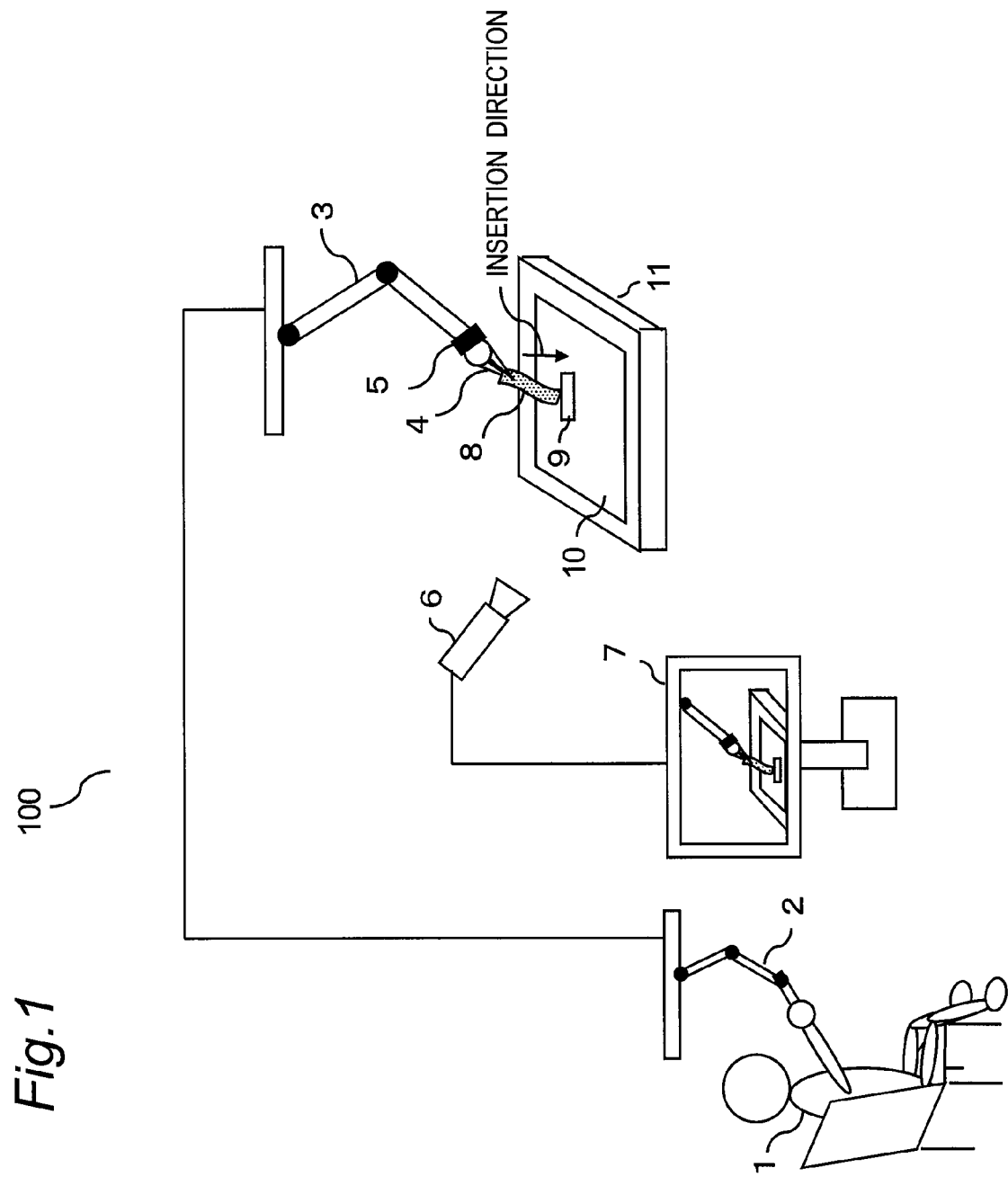
FIG. 1 is a view showing a schematic configuration of a master slave robot according to a first embodiment of the present invention.

FIG. 1 shows a slave arm 3 that functions as a robot for performing a task of inserting a fine component 8 gripped by a hand 4 to an insertion port 9 of an instrument 10 provided on a workbench 11. This task is imaged by an imaging device 6 such as a camera and is projected on a display 7. FIG. 1 shows a master slave robot 100 including a master arm 2 that is manipulated by an operator (person) 1 who is watching a motion picture projected on the display 7 under such a condition. Change in magnification percentage of the motion picture or in motion ratio of the slave arm 3 to the master arm 2 in the master slave robot 100 causes change in correlation between the formerly watched motion picture and manipulation of the master arm 2 or how to sense force, so that the operator 1 has a sense of incongruity.

Figure 3A:
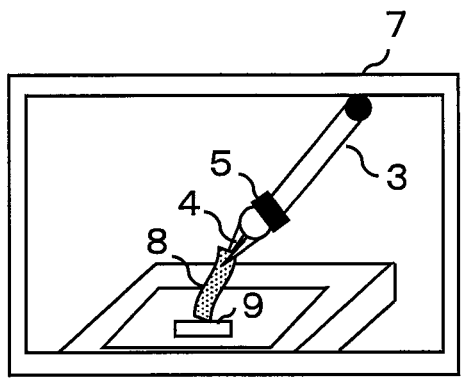
FIG. 3A is an explanatory view of a motion picture and how to sense force in a conventional master slave robot.
Figure 3B:
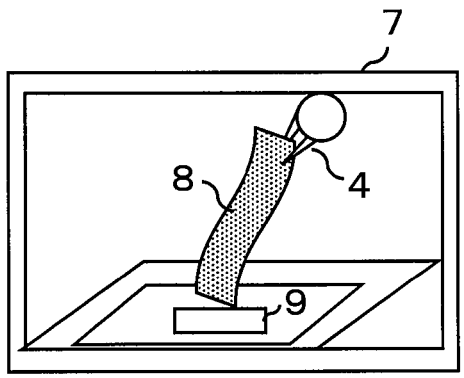
FIG. 3B is an explanatory view of a motion picture and how to sense force in the conventional master slave robot.
Figure 3C:
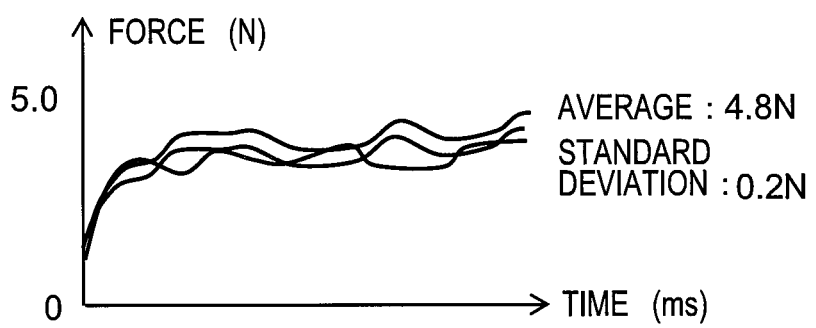
FIG. 3C is a graph indicating the relationship between force applied to a target article and time in the master slave robot according to the present invention.
Figure 3D:
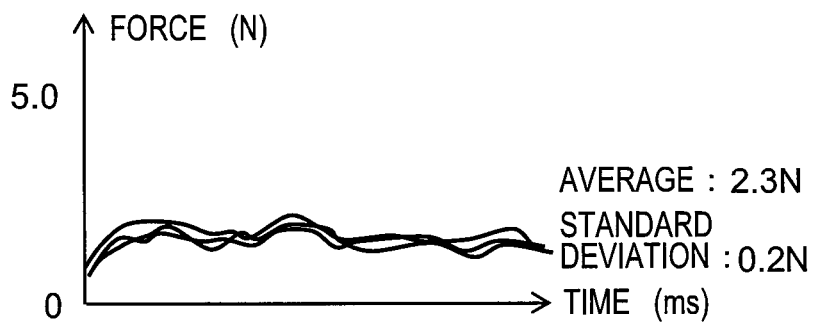
FIG. 3D is a graph indicating the relationship between force applied to a target article and time in the master slave robot according to the present invention.

Specific description is made with reference to (A) and (B) of FIG. 3 as well as FIGS. 3C and 3D. FIGS. 3A and 3B each show a motion picture on the screen of the display 7 watched by the operator 1 in the master slave robot 100 shown in FIG. 1. FIG. 3B is larger in magnification percentage of the motion picture than FIG. 3A and shows the on-screen fine component 8 and the like that are larger than the actual component. The on-screen fine component 8 of such a larger magnification percentage appears to the operator 1 as having a larger bending degree. The operator 1 accordingly performs the task with force smaller than force actually necessary for the task. The operator 1 thus fails to apply the force necessary for the task to the master arm 2 and is hard to perform the task accurately. Proposed in view of this problem is a technique that matches the motion picture watched by the operator 1 to the manipulation of the operator 1 with no sense of incongruity.

Specifically, in the method according to Patent Literature 1, the motion ratio of the slave arm 3 to the master arm 2 is automatically adjusted in accordance with the magnification percentage of the motion picture projected on the display 7. For example, when the magnification percentage is multiplied by k times, the motion ratio is changed to 1/k. In the method according to Patent Literature 2, a position, an angle, or the magnification percentage projected on the display 7 is automatically adjusted in accordance with shift of the master arm 2 manipulated by the operator 1.

However, in the method according to Patent Literature 1, the motion ratio is changed in accordance with the magnification percentage of the motion picture whereas magnitude of force fed back to the operator 1 is not changed. Also in the method according to Patent Literature 2, a motion picture is adjusted in accordance with manipulation of a master whereas magnitude of fed back force is not changed. In short, none of these Patent Literatures takes into consideration change of how the operator 1 senses fed back force in accordance with how the motion picture appears. In the examples shown in FIGS. 3A and 3B, there is no solution to the problem that the operator 1 tends to perform a task with smaller force when the motion picture is enlarged.

It is thus required to control the master slave robot 100 to automatically adjust fed back force in accordance with the motion picture so that the operator 1 is capable of manipulating the master arm 2 in accordance with the motion picture projected on the display 7 with no sense of incongruity.

Figure 4A:
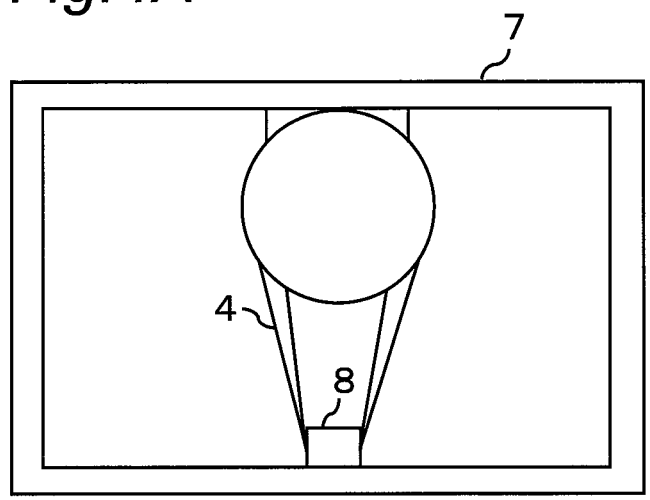
FIG. 4A is an explanatory view of a motion picture and how to sense force in the conventional master slave robot (a gripping task)
Figure 4B:
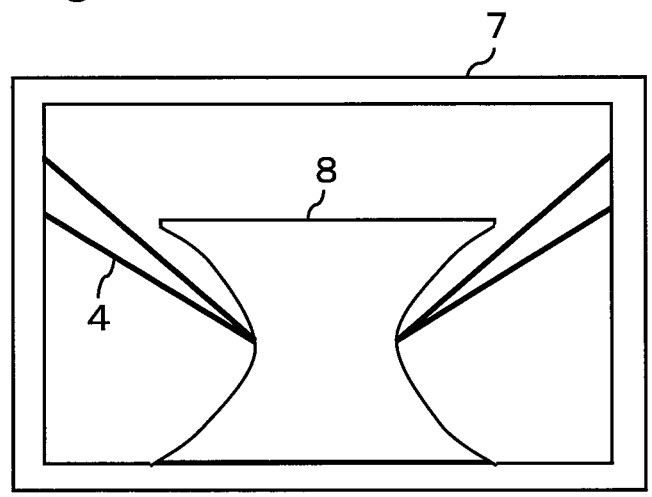
FIG. 4B is an explanatory view of a motion picture and how to sense force in the conventional master slave robot (a gripping task)

A different exemplary task is described with reference to FIGS. 4A and 4B. FIGS. 4A and 4B exemplify a task of gripping and conveying the fine component 8. FIG. 4B is larger in magnification percentage than FIG. 4A and shows the larger fine component 8. Specifically, FIG. 4A merely projects that the hand 4 grips the fine component 8. In contrast, FIG. 4B shows the hand 4 at the distal end of the slave arm 3 and the fine component 8 both of which are enlarged, so as to illustrate well that the fine component 8 is warped and deformed by the hand 4. In this manner, the fine component 8 appears as being more deformed with a larger magnification percentage, so that the operator 1 stops applying force in accordance with the larger change in the motion picture. The operator 1 accordingly fails to apply force necessary for gripping the fine component 8 to the master arm 2, and the fine component 8 falls off the hand 4 when the fine component 8 is lifted upward and conveyed. In this manner, increase in magnification percentage largely affects the visual sense of the operator 1, who fails to apply force enough to achieve the task.

Thus, one non-limiting and exemplary embodiment provides a control apparatus and a control method for a master slave robot, a robot, a control program for the master slave robot, and an integrated electronic circuit for control of the master slave robot, in each of which the master slave robot is manipulated by an operator who is watching a motion picture, and matches the picture watched by the operator to manipulation of the operator with no sense of incongruity.

Examples of the disclosed technique are as follows.

1st aspect: A control apparatus for a master slave robot that comprises a slave arm that performs a task to a soft object and a master arm manipulated by a person who remotely manipulates the slave arm, the person performing the task using the master slave robot while watching a state of the task imaged by an imaging device and displayed on a display unit, the control apparatus comprising:

a force information acquiring unit that acquires information on force externally applied to the slave arm;

a display information acquiring unit that acquires magnification percentage information at the display unit that displays the task;

a force information correcting unit that corrects the force information acquired from the force information acquiring unit to be smaller as the magnification percentage information acquired from the display information acquiring unit is larger, to generate corrected force information; and a force information presentation unit that presents, to the master arm, the corrected force information generated by the force information correcting unit.

According to the aspect of the present invention, it is possible to present force corresponding to manipulation of the operator (person) and the motion picture watched by the operator, so that the picture watched by the operator can be matched to the manipulation of the operator with a less sense of incongruity. This allows the task to be performed accurately.

2nd aspect: The control apparatus for the master slave robot according to the 1st aspect, wherein the display information acquiring unit functions as a deformation information calculation unit that calculates, as the magnification percentage information, deformation information on the soft object deformed by the task of the slave arm on the display unit.

This aspect achieves correction of the fed back force information so that the master arm can be manipulated in accordance with the deformation information with no sense of incongruity. In other words, the operator is capable of applying force necessary for the task even with change in magnification percentage of the motion picture.

3rd aspect: The control apparatus for the master slave robot according to the 2nd aspect, wherein the display information acquiring unit calculates and uses a length of a deformed range of the soft object, as the deformation information on the soft object deformed by the task of the slave arm on the display unit.

According to this aspect, a deformation amount of the on-screen soft object is calculated on the display unit. The operator is thus capable of applying appropriate force when the deformation of the soft object is easily visible on the screen.

4th aspect: The control apparatus for the master slave robot according to the 2nd aspect, wherein the display information acquiring unit calculates and uses an area of a deformed range of the soft object, as the deformation information on the soft object deformed by the task of the slave arm on the display unit.

This aspect achieves calculation of the deformation information with an on-screen deformed area taken into consideration, so that the operator is capable of applying appropriate force even with change in method of performing the task by the operator or in material for the soft object.

5th aspect: The control apparatus for the master slave robot according to any one of the 2nd to 4th aspects, further comprising:

a master motion information acquiring unit that acquires master motion information including at least one of a position, an orientation, a velocity, and an angular velocity of the master arm, wherein the force information correcting unit:

calculates a shift amount $d_b$ of the master arm from the master motion information;

acquires a deformation amount $d_d$ of the soft object calculated by the deformation information calculation unit;

divides the shift amount $d_b$ by the deformation amount $d_d$; and multiplies a division result ($d_b/d_d$) by a correction coefficient and the force information to generate the corrected force information.

This aspect achieves correction of the force information in accordance with the ratio between the deformation information and the shift amount of the master motion information, so that the operator is capable of applying appropriate force for the task.

6th aspect: The control apparatus for the master slave robot according to any one of the 1st to 5th aspects, wherein the force information correcting unit determines a magnitude as a reference of each of the magnification percentage information and the force information upon correcting the force information.

7th aspect: The control apparatus for the master slave robot according to any one of the 1st to 6th aspects, wherein the force information correcting unit changes a correction amount in accordance with softness of the soft object.

8th aspect: The control apparatus for the master slave robot according to any one of the 1st to 7th aspects, wherein, when correcting the force information acquired from the force information acquiring unit to be smaller as the magnification percentage information is larger to generate the corrected force information, the force information correcting unit corrects a magnitude of the force information to be smaller to generate the corrected force information, or shortens an update period of the force information to generate the corrected force information.

This aspect achieves accurate correction of force in the task requiring application of force.

9th aspect: A robot comprising:

the control apparatus for a master slave robot according to any one of the 1st to 8th aspects; and the master slave robot.

This aspect achieves presentation of force corresponding to the manipulation of the operator (person) and the motion picture watched by the operator, so that the picture watched by the operator can be matched to the manipulation of the operator with a less sense of incongruity. This allows the task to be performed accurately.

10th aspect: A method of controlling a master slave robot that comprises a slave arm that performs a task to a soft object and a master arm manipulated by a person who remotely manipulates the slave arm, the person performing the task using the master slave robot while watching a state of the task imaged by an imaging device and displayed on a display unit, the method comprising:

acquiring, at a force information acquiring unit, information on force externally applied to the slave arm;

acquiring, at a display information acquiring unit, magnification percentage information at the display unit that displays the task;

correcting the force information acquired from the force information acquiring unit to be smaller as the magnification percentage information acquired from the display information acquiring unit is larger, to generate corrected force information at a force information correcting unit; and presenting, at a force information presentation unit to the master arm, the corrected force information generated by the force information correcting unit.

According to the aspect of the present invention, it is possible to present force corresponding to manipulation of the operator (person) and the motion picture watched by the operator, so that the picture watched by the operator can be matched to the manipulation of the operator with a less sense of incongruity. This allows the task to be performed accurately.

11th aspect: A computer-readable recording medium including a control program for a master slave robot that comprises a slave arm that performs a task to a soft object and a master arm manipulated by a person who remotely manipulates the slave arm, the person performing the task using the master slave robot while watching a state of the task imaged by an imaging device and displayed on a display unit, the control program causing a computer to execute steps of:

acquiring, at a force information acquiring unit, information on force externally applied to the slave arm;

acquiring, at a display information acquiring unit, magnification percentage information at the display unit that displays the task;

correcting the force information acquired from the force information acquiring unit to be smaller as the magnification percentage information acquired from the display information acquiring unit is larger, to generate corrected force information at a force information correcting unit; and presenting, at a force information presentation unit to the master arm, the corrected force information generated by the force information correcting unit.

According to the aspect of the present invention, it is possible to present force corresponding to manipulation of the operator (person) and the motion picture watched by the operator, so that the picture watched by the operator can be matched to the manipulation of the operator with a less sense of incongruity. This allows the task to be performed accurately.

12th aspect: An integrated electronic circuit for control of a master slave robot that comprises a slave arm that performs a task to a soft object and a master arm manipulated by a person who remotely manipulates the slave arm, the person performing the task using the master slave robot while watching a state of the task imaged by an imaging device and displayed on a display unit, the integrated electronic circuit comprising:

a force information acquiring unit that acquires information on force externally applied to the slave arm;

a display information acquiring unit that acquires magnification percentage information at the display unit that displays the task;

a force information correcting unit that corrects the force information acquired from the force information acquiring unit to be smaller as the magnification percentage information acquired from the display information acquiring unit is larger, to generate corrected force information; and a force information presentation unit that presents, to the master arm, the corrected force information generated by the force information correcting unit.

According to the aspect of the present invention, it is possible to present force corresponding to manipulation of the operator (person) and the motion picture watched by the operator, so that the picture watched by the operator can be matched to the manipulation of the operator with a less sense of incongruity. This allows the task to be performed accurately.

First Embodiment

Schematically described is a master slave robot 100 including a control apparatus 101 for the master slave robot 100 according to the first embodiment of the present invention.

FIG. 1 shows a task of inserting a fine component 8 using the master slave robot 100.

As shown in FIG. 1, exemplified is a task of attaching the fine component 8 to an insertion port 9 of a printed circuit board for an instrument 10 such as a television, a DVD recorder, or a mobile phone in cell production at a plant.

The master slave robot 100 includes a slave arm 3 functioning as a robot that is located on a workbench 11 or a wall surface where the instrument 10 is provided and performs the task of inserting the fine component 8 to the insertion port 9 of the instrument 10.

The slave arm 3 has the distal end to which a hand 4 for gripping the fine component 8 is attached.

The workbench 11 is provided with an imaging device 6 such as a camera for imaging the fine component 8 and the insertion port 9 that are enlarged, and a display 7 projects the imaged motion picture.

A force sensor 5 is provided at a wrist of the hand 4 and measures reactive force generated when the fine component 8 is in contact with the insertion port 9 or the instrument 10.

The slave arm 3 moves when an operator 1 manipulates the master arm 2 while checking on the display the motion picture imaged by the imaging device 6. Furthermore, force measured by the force sensor 5 is fed back from the slave arm 3 to the master arm 2, so that the operator 1 is capable of operating the slave arm 3 as if directly manipulating the fine component 8.

Figure 2:
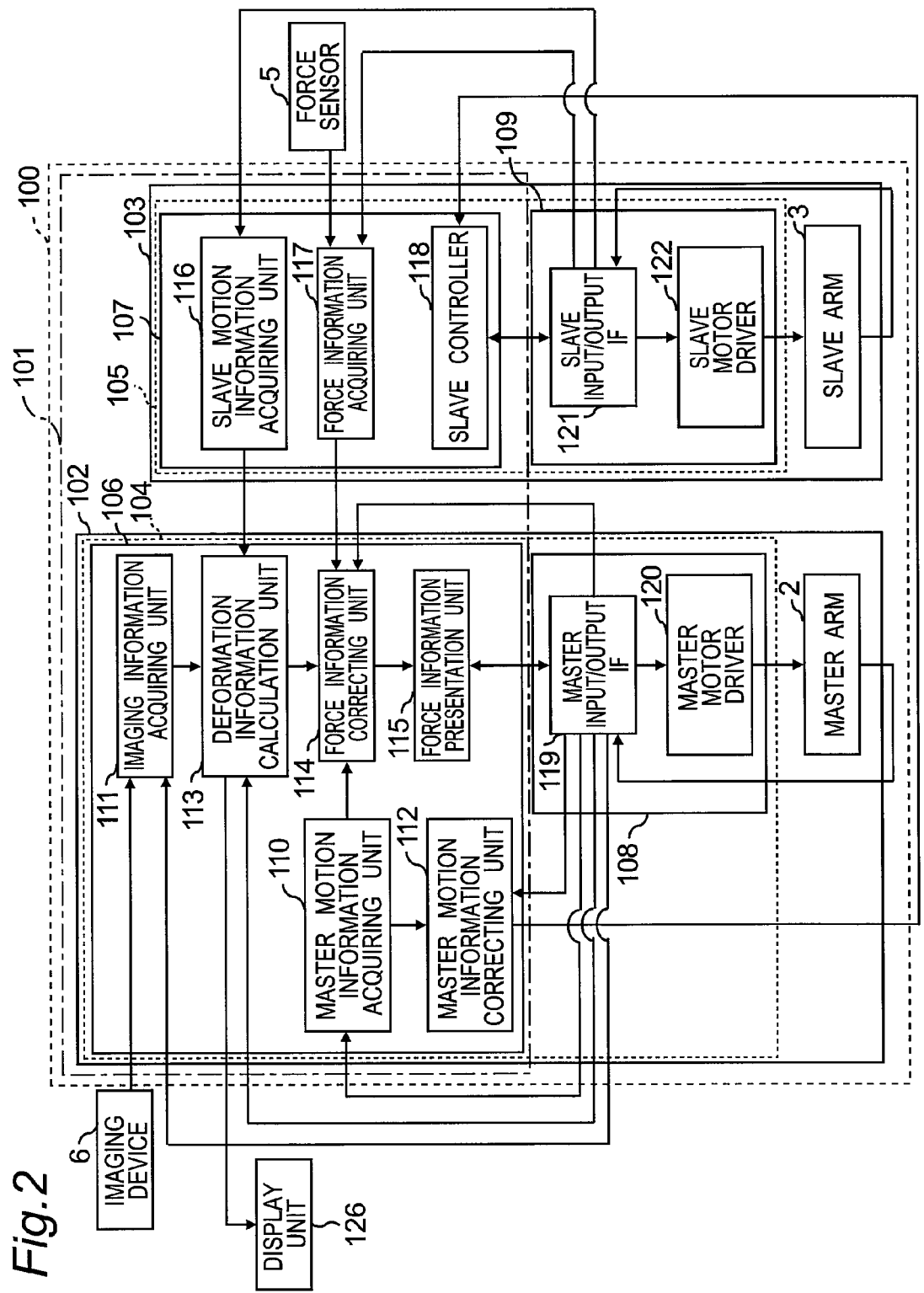
FIG. 2 is a block diagram of the master slave robot according to the first embodiment of the present invention.

FIG. 2 is a block diagram of the master slave robot 100 according to the first embodiment of the present invention. In FIG. 2, the master slave robot 100 includes a master robot 102 and a slave robot 103. The master robot 102 includes the master arm 2 and a control apparatus 104 for the master arm 2. The slave robot 103 includes the slave arm 3 and a control apparatus 105 for the slave arm 3.

The control apparatus 104 for the master arm 2 generates motion of the slave arm 3 and corrects force information acquired by the slave robot 103 to present the corrected force information. The control apparatus 105 for the slave arm 3 controls a position and an orientation of the slave arm 3.

The first embodiment is described in detail below.

<Description of Control Apparatus for Master Arm>

The control apparatus 104 for the master arm 2 includes a master control apparatus main body 106 and a master peripheral device 108.

<Description of Control Apparatus for Slave Arm>

The control apparatus 105 for the slave arm 3 includes a slave control apparatus main body 107 and a slave peripheral device 109.

<Description of Master Control Apparatus Main Body>

The master control apparatus main body 106 includes a master motion information acquiring unit 110, an imaging information acquiring unit 111, a master motion information correcting unit 112, a deformation information calculation unit 113 functioning as one example of a display information acquiring unit, a force information correcting unit 114, and a force information presentation unit 115.

(Master Motion Information Acquiring Unit 110)

The master motion information acquiring unit 110 receives position information and orientation information on the master arm 2 from a master input/output IF 119, and time information from a timer incorporated in the master input/output IF 119. The master motion information acquiring unit 110 acquires velocity information by differentiating the position information with respect to the time information, which is received from the master input/output IF 119. The master motion information acquiring unit 110 acquires angular velocity information by differentiating the orientation information with respect to the time information. FIG. 5 indicates the time information, the position information, the orientation information, the velocity information, and the angular velocity information, which are acquired by the master motion information acquiring unit 110. The position information, the orientation information, the velocity information, and the angular velocity information configure motion information (master motion information) on the master arm 2.

The master motion information acquiring unit 110 transmits the position information, the orientation information, the velocity information, and the angular velocity information on the master arm 2, as well as the time information thus acquired, to the master motion information correcting unit 112 and the force information correcting unit 114.

(Imaging Device 6)

Figure 6A:
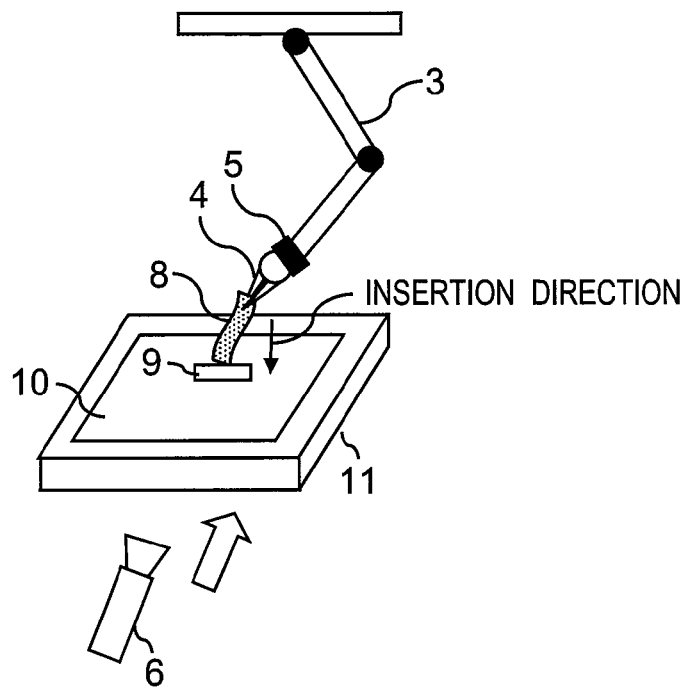
FIG. 6A is an explanatory view of how to locate an imaging device in the master slave robot according to the first embodiment of the present invention.
Figure 6B:
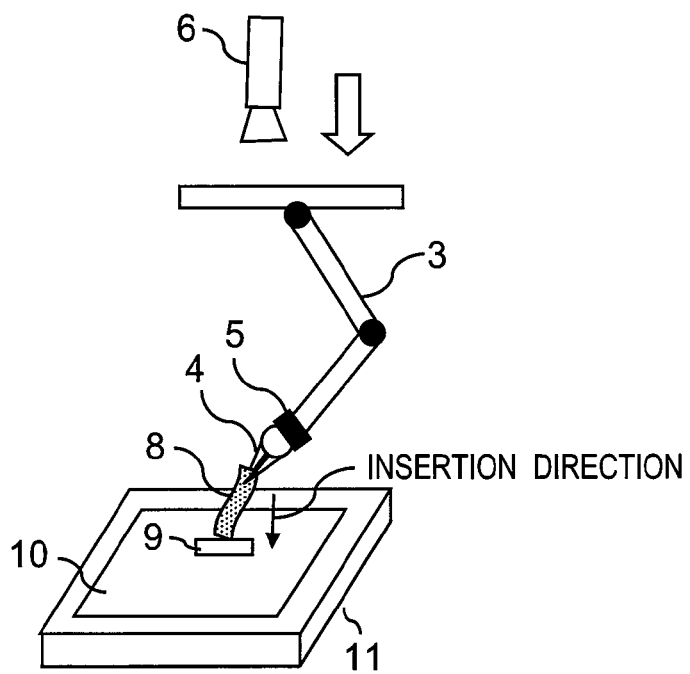
FIG. 6B is an explanatory view of how to locate the imaging device in the master slave robot according to the first embodiment of the present invention.
Figure 6C:
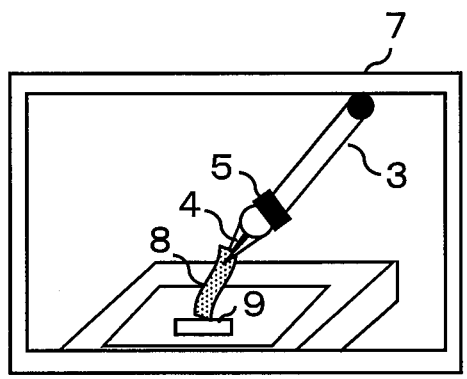
FIG. 6C is an explanatory view of how to locate the imaging device in the master slave robot according to the first embodiment of the present invention.
Figure 6D:
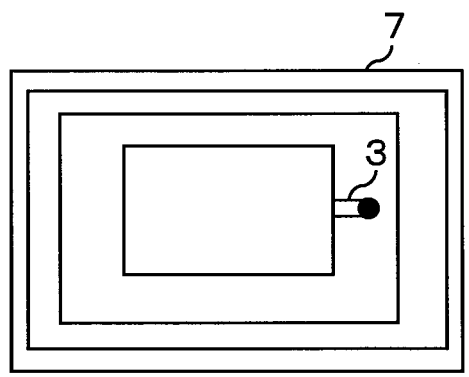
FIG. 6D is an explanatory view of how to locate the imaging device in the master slave robot according to the first embodiment of the present invention.

The imaging device 6 images a task performed by the slave arm 3, specifically, images mainly the hand 4, the fine component 8, the insertion port 9, and the vicinities thereof. The imaging device 6 is capable of changing a magnification percentage for imaging. The imaging device 6 can be also changed in location or orientation thereof. The imaging device 6 can be located at any position or in any orientation, although the imaging device 6 needs to be located at a position and in orientation so that imaging targets (particularly the hand 4, the fine component 8, and the insertion port 9) are not overlapped and shift and deformation of the imaging targets are visible in the imaged picture. In the examples shown in FIGS. 6A and 6B, the imaging targets are not overlapped and shift thereof is also visible in the imaged picture in the position and the orientation of FIG. 6A rather than the position and the orientation of FIG. 6B. FIGS. 6C and 6D each show a motion picture projected on the display 7. According to these pictures, shift of the slave arm 3 and deformation of the fine component 8 are more visible on the screen in the position and the orientation of FIG. 6A.

Figure 7:
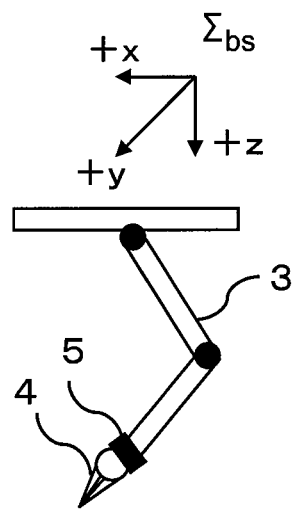
FIG. 7 is an explanatory view of a coordinate system of the imaging device in the master slave robot according to the first embodiment of the present invention.
Figure 7:
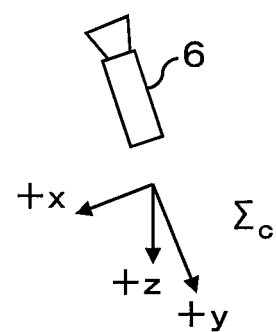

The imaging device 6 transmits, to the imaging information acquiring unit 111, imaged picture information on a picture imaged by the imaging device 6, information on a magnification percentage for imaging, and imaging device position information including a position and an orientation of the imaging device 6 upon imaging, as imaging information. The imaging device position information is expressed using a coordinate system $\Sigma_{bs}$ of the slave arm 2 as indicated in FIG. 7.

Figure 8:
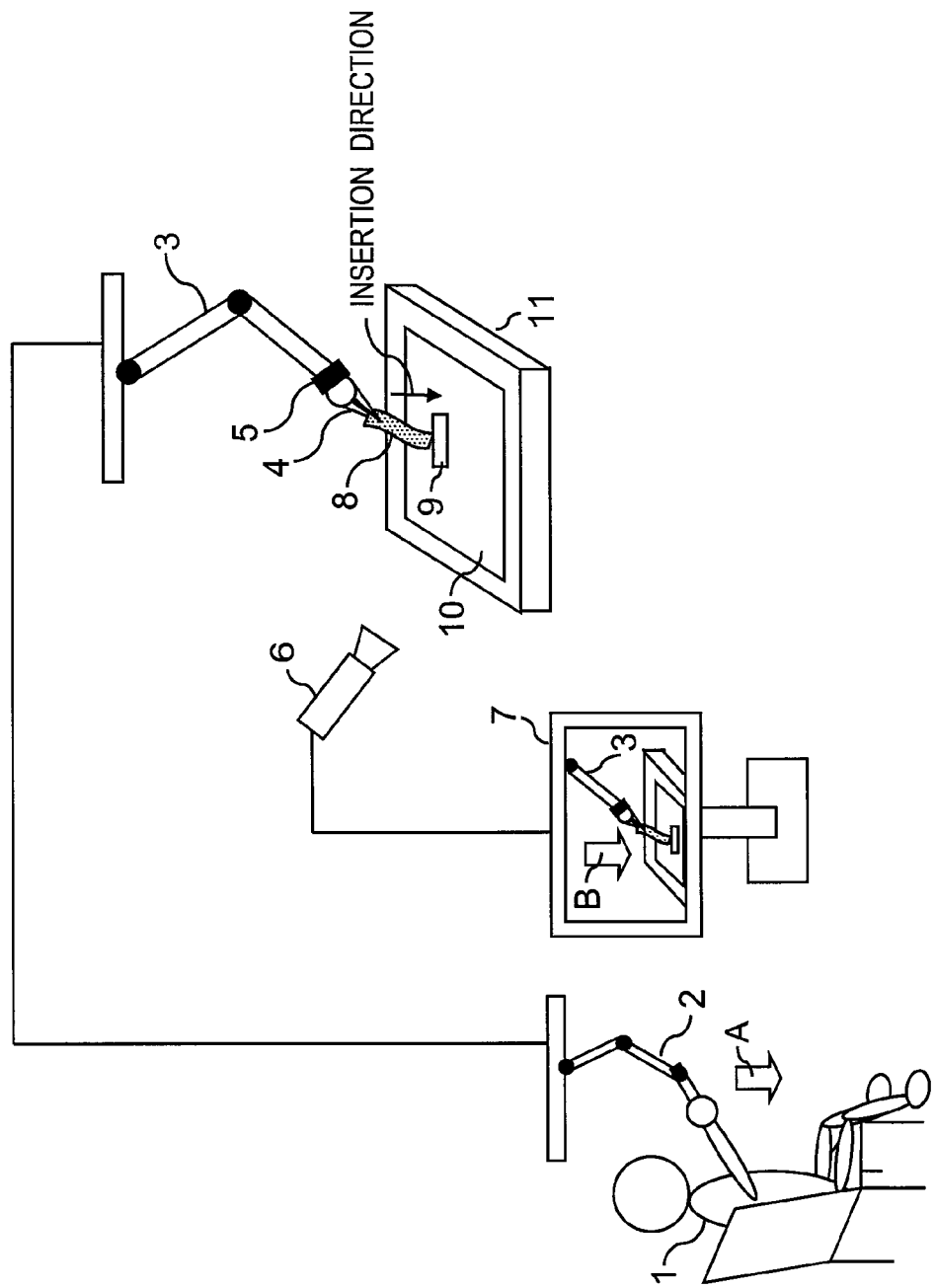
FIG. 8 is an explanatory view of a location of the imaging device in the master slave robot according to the first embodiment of the present invention.

As shown in FIG. 8, the imaging device 6 is located so that a direction of manipulation of the master arm 2 by the operator 1 (an arrow A in FIG. 8) is parallel to a direction of motion of the on-screen slave arm 3 on the screen of the display 7 (an arrow B in FIG. 8).

The imaging device 6 exemplified in this case mainly performs two-dimensional imaging. The imaging device 6 can be alternatively a three-dimensional imaging device or include two imaging devices so as to image in various directions.

(Imaging Information Acquiring Unit 111)

The imaging information acquiring unit 111 receives imaged picture information, magnification percentage information, and imaging device position information from the imaging device 6 and time information from the timer incorporated in the master input/output IF 119.

FIG. 9 exemplifies the magnification percentage information and the imaging device position information (including orientation information on the imaging device) acquired by the imaging information acquiring unit 111 other than the imaged picture information, and the time information. The imaged picture information indicates a picture itself projected on the display 7. Imaging information includes imaged picture information, magnification percentage information, and imaging device position information.

The imaging information acquiring unit 111 is capable of acquiring imaged picture information, magnification percentage information, and imaging device position information from the imaging device 6 by way of the master input/output IF 119.

The imaging information acquiring unit 111 transmits, to the deformation information calculation unit 113, the imaged picture information, the magnification percentage information, the imaging device position information, which are thus acquired, and the time information.

Figures 10, 11:
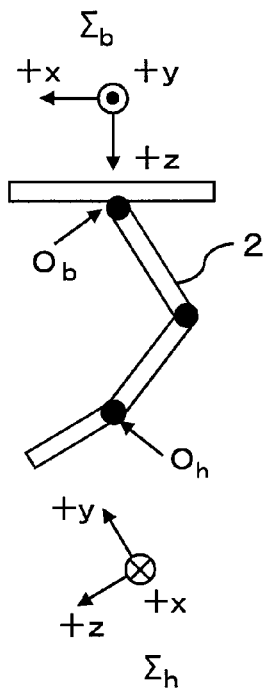
FIG. 10 is a data chart of magnification percentage information, imaging device position information, and time information on the master slave robot according to the first embodiment of the present invention (when the magnification percentage information varies)
FIG. 11 is an explanatory view of a coordinate system in the master slave robot according to the first embodiment of the present invention.

FIG. 9 exemplifies a case where the magnification percentage does not change in chronological order. The magnification percentage can alternatively change in chronological order. For example, when performing a task of widely shifting the gripped fine component 8 and then performing a task of attaching the fine component 8 to a connector, the magnification percentage is decreased in the step of the shifting task so that a wide region is imaged. In contrast, the magnification percentage is increased in the step of the attaching task so that an attached portion is more visible. The magnification percentage can change in chronological order in this manner. FIG. 10 exemplifies magnification percentage information in such a case.

(Master Motion Information Correcting Unit 112)

The master motion information correcting unit 112 receives motion information (master motion information) on the master arm 2 and time information from the master motion information acquiring unit 110. The master motion information correcting unit 112 calculates a shift amount of the hand 4 of the master arm 2 in each sampling period from the acquired motion information on the master arm 2, multiplies the calculated shift amount and a gain, and transmits the obtained value as corrected master motion information (a shift amount command value) thus obtained, to a slave controller 118.

Described next is how the master motion information correcting unit 112 calculates a shift amount of the hand 4 of the master arm 2. The motion information on the master arm 2 indicated in FIG. 5 includes a position and an orientation in a base coordinate system $\Sigma_b$ with an origin $O_b$ in FIG. 11 serving as a reference point. The master motion information correcting unit 112 converts this motion information to a shift amount in a hand coordinate system $\Sigma_h$ with an origin $O_h$ of the hand 4 serving as a reference point. Specifically, the master motion information correcting unit 112 multiplies a shift amount $d_b$ of a position and orientation in each sampling period in the base coordinate system $\Sigma_b$ and a transformation matrix ${}^bT_h$ to calculate a shift amount $d_h$ of a position and orientation in each sampling period in the hand coordinate system $\Sigma_h$. A shift amount d indicates a difference between a position and orientation $p_0$ at time $t_0$ and a position and orientation $p_1$ at time $t_1$ after elapse of one sampling period, that is, $d = \Delta p = p_1 - p_0$.

Described next is how the master motion information correcting unit 112 calculates a shift amount command value. The master motion information correcting unit 112 multiplies respective elements (a position (x, y, z) and an orientation ($r_x$, $r_y$, $r_z$)) of the shift amount $d_h$ of a position and orientation in each sampling period in the hand coordinate system $\Sigma_h$ and a gain $k_d$ (e.g. 0.1) to calculate corrected master motion information (a shift amount command value $d_m$). The master motion information correcting unit 112 sets the gain $k_d$ so as to have a value more than one when shift of the slave arm 2 is enlarged relatively to shift of the master arm 2. In contrast, the master motion information correcting unit 112 sets the gain $k_d$ so as to have a value less than one when the shift is reduced. The master motion information correcting unit 112 is capable of setting the gain $k_d$ so as to have a constant for each element, and the operator 1 is capable of inputting the gain $k_d$ to the master motion information correcting unit 112 through the master input/output IF 119.

FIG. 12 shows examples of corrected master motion information and time information. The master motion information correcting unit 112 transmits the corrected master motion information thus calculated and the time information to the slave controller 118.

(Deformation Information Calculation Unit 113)

The deformation information calculation unit 113 receives the imaged picture information, the magnification percentage information, the imaging device position information, and the time information from the imaging information acquiring unit 111, and receives slave motion information and time information from a slave motion information acquiring unit 116. The deformation information calculation unit 113 calculates in the following manner from the slave motion information and the imaging information thus acquired, motion information of the slave arm 3 on the screen of the display 7 (called on-screen slave motion information) or deformation information for a case where a target object (the fine component 8) or a target article (the insertion port 9) on the screen of the display 7 is a soft object (called on-screen soft object deformation information).

(i) When calculating only on-screen slave motion information:

Described next is how the deformation information calculation unit 113 calculates on-screen slave motion information. On-screen slave motion information indicates motion information on the on-screen slave arm 3 projected on the display 7. The deformation information calculation unit 113 initially converts slave motion information indicated in the slave base coordinate system $\Sigma_{bs}$ illustrated in FIG. 7 to slave motion information indicated in a coordinate system $\Sigma_c$ of the imaging device 6 illustrated in FIG. 7. The deformation information calculation unit 113 converts, to the coordinate system $\Sigma_c$ of the imaging device, imaging device position information indicated in the slave base coordinate system $\Sigma_{bs}$. The deformation information calculation unit 113 subsequently multiplies the slave motion information indicated in the coordinate system $\Sigma_c$ of the imaging device 6 and magnification percentage information to calculate on-screen slave motion information. As to the magnification percentage information, the deformation information calculation unit 113 needs to adjust the magnification percentage so that a shift amount of the slave arm 2 indicated in the coordinate system $\Sigma_c$ of the imaging device 6 is equal to a shift amount of the on-screen slave arm 2 when the slave arm 2 is imaged from the location of the imaging device 6, and the deformation information calculation unit 113 needs to perform calibration so that the magnification percentage is equal to one. In other words, the deformation information calculation unit 113 defines, as one, the magnification percentage for the case where a shift amount A of the slave arm 3 is equal to a shift amount B of the on-screen slave arm 3 in FIG. 13. On-screen slave motion information is exemplified by the motion information indicated in FIG. 5. As described above, the magnification percentage is defined to be one as a reference when the shift amount A of the actual slave is equal to the shift amount B of the on-screen slave. The deformation information calculation unit 113 is alternatively capable of defining a different magnification percentage to be one as a reference. For example, when the most decreased magnification percentage is defined to be one, large force can be quite effectively applied to a soft object that is soft and largely deformed. In contrast, when the most increased magnification percentage is defined to be one, it is possible to effectively prevent too large force from being applied to a soft object that is not soft and less likely to be deformed. The deformation information calculation unit 113 is capable of changing the reference in accordance with a task or a target object in these manners.

The deformation information calculation unit 113 is alternatively capable of calculating on-screen slave motion information through picture processing in accordance with imaged picture information. Specifically, the deformation information calculation unit 113 detects the distal end of the hand 4 of the slave arm 3 on the screen and calculates motion information on the distal end as on-screen slave motion information.

(ii) When calculating only on-screen soft object deformation information:

Described next is how the deformation information calculation unit 113 calculates on-screen soft object deformation information. On-screen soft object deformation information indicates deformation information on an on-screen soft object projected on the display 7.

Figure 14A:
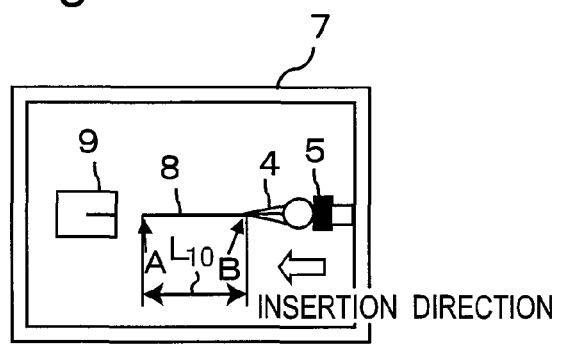
FIG. 14A is an explanatory view of a deformation amount of a fine component in the master slave robot according to the first embodiment of the present invention.
Figure 14B:
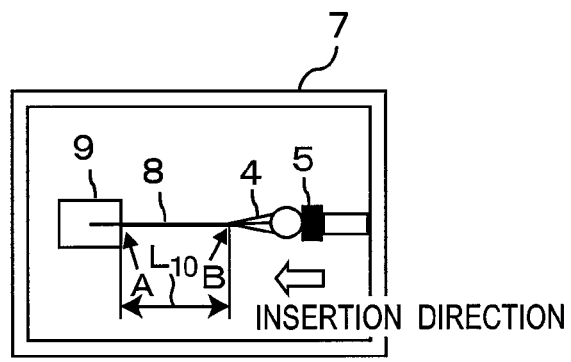
FIG. 14B is an explanatory view of the deformation amount of the fine component in the master slave robot according to the first embodiment of the present invention.
Figure 14C:
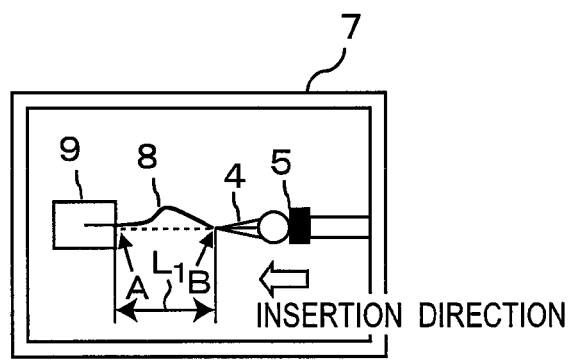
FIG. 14C is an explanatory view of the deformation amount of the fine component in the master slave robot according to the first embodiment of the present invention.

A task of inserting the fine component 8 is described with reference to FIGS. 14A to 14C. FIGS. 14A to 14C each show a state where the fine component 8 gripped by the hand 4 shifts in an insertion direction on the screen of the display 7 so as to be inserted to a connector 9. It is noted that the insertion direction in the picture projected on the display 7 is rotated by about 90 degrees from the state shown in FIG. 1 so that deformation of the fine component 8 is easily visible. FIG. 14A shows a state where the fine component 8 is not in contact with the connector 9. FIG. 14B shows a state where the fine component 8 comes into contact with the connector 9. FIG. 14C shows a state where the fine component 8 is inserted to the connector 9 and the fine component 8 is bent. The deformation information calculation unit 113 detects ends A and B of the fine component 8 through picture processing. In an example, assume that the end A of the fine component 8 is the distal end most distant from the hand 4 (the distal end initially inserted to the connector 9) and the end B is the proximal end closest to the hand 4. The deformation information calculation unit 113 detects a distance in the insertion direction between the end A and the end B thus detected. In FIG. 14C, the deformation information calculation unit 113 detects a linear distance (the shortest distance between the end A and the end B) $L_1$ indicated by a dashed line between the end A and the end B. The deformation information calculation unit 113 detects, as on-screen soft object deformation information, a change amount ($L_{10}-L_1$) from a distance $L_{10}$ in the state where the fine component 8 is not bent, to the detected distance $L_1$. The deformation information calculation unit 113 needs to calibrate, at the time of FIG. 14A or 14B, the distance $L_{10}$ in the insertion direction between the end A and the end B in the state where the fine component 8 is not bent. Specifically, the deformation information calculation unit 113 stores in an inner storage (not shown), as the initial distance $L_{10}$, the shortest distance $L_1$ between the end A and the end B at the time of FIG. 14A or 14B.

Figure 15A:
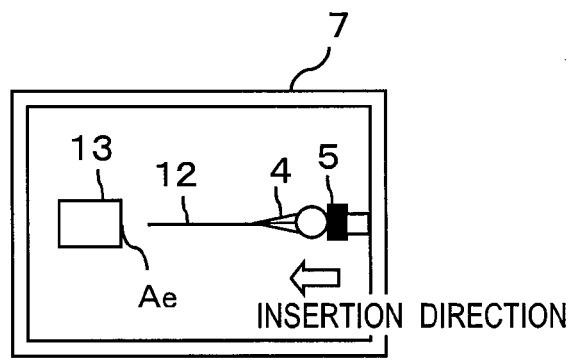
FIG. 15A is an explanatory view of a deformation amount of a soft target article in the master slave robot according to the first embodiment of the present invention.
Figure 15B:
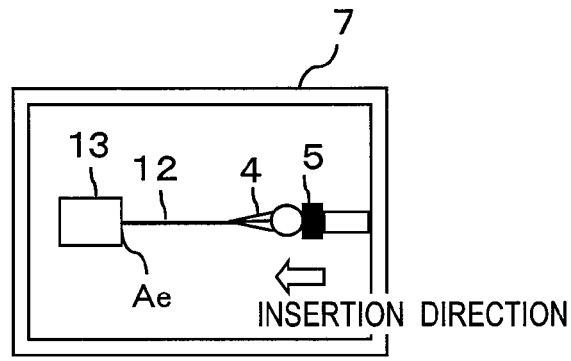
FIG. 15B is an explanatory view of a deformation amount of the soft target article in the master slave robot according to the first embodiment of the present invention.
Figure 15C:
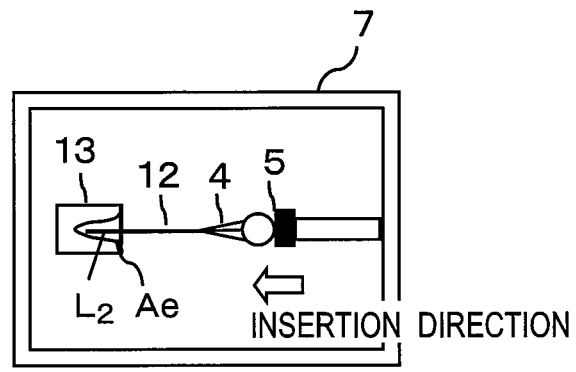
FIG. 15C is an explanatory view of a deformation amount of the soft target article in the master slave robot according to the first embodiment of the present invention.

Other than the task of inserting the fine component 8, the deformation information calculation unit 113 is capable of calculating on-screen soft object deformation information also in a case where a target object is hard and a target article [an article to be subjected to a task] is soft as in a task of inserting a hard medical instrument into a soft organ. This case is described with reference to FIGS. 15A to 15C. FIGS. 15A to 15C each show a state where a hard target object 12 gripped by the hand 4 shifts in the insertion direction on the screen of the display 7 so as to be inserted to a soft target article 13. It is noted that the insertion direction in the picture projected on the display 7 is rotated by about 90 degrees from the state shown in FIG. 1 so that deformation of the soft target article 13 is easily visible. FIG. 15A shows a state where the hard target object 12 is not in contact with the soft target article 13. FIG. 15B shows a state where the hard target object 12 comes into contact with the soft target article 13. FIG. 15C shows a state where the hard target object 12 is inserted to the soft target article 13 and the soft target article 13 is bent. The deformation information calculation unit 113 detects an edge Ae of a surface where the hard target object 12 is in contact with the soft target article 13 on the screen through picture processing. The deformation information calculation unit 113 measures a deformed distance (length) $L_2$ of the detected edge Ae in the insertion direction.

Figure 16A:
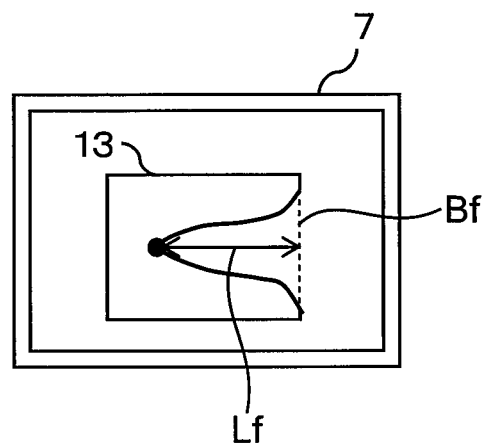
FIG. 16A is an explanatory view of an example of a method of calculating a deformation amount in the master slave robot according to the first embodiment of the present invention.
Figure 16B:
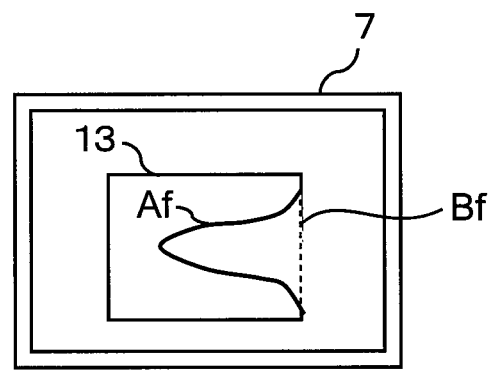
FIG. 16B is an explanatory view of an example of the method of calculating the deformation amount in the master slave robot according to the first embodiment of the present invention.

In this case, the deformation information calculation unit 113 measures, as the distance to be measured, the deformed distance $L_2$ of a portion in the edge Ae in contact with the hard target object 12. The deformation information calculation unit 113 detects, as on-screen soft object deformation information, a change amount $(L_{20}-L_2)$ from a distance $L_{20}$ in the state where the soft target article 13 is not bent, to the detected distance $L_2$. The deformation information calculation unit 113 needs to calibrate, at the time of FIG. 15A or 15B, the position of the edge Ae in the insertion direction in the state where the soft target article 13 is not bent. Specifically, the deformation information calculation unit 113 stores in the inner storage, as the initial distance $L_{20}$, the distance $L_2$ at the time of FIG. 15A or 15B. The deformation information calculation unit 113 is capable of measuring a distance of the most deformed portion in the edge Ae or an average value of distances of deformed portions, as an alternative method of calculating the measured distance $L_2$. Such a case is described with reference to FIGS. 16A and 16B. The most deformed portion has a longest distance Lf from a dashed line Bf to an edge Af indicated in FIG. 16A, and the distance Lf indicated in this figure is a deformation amount in this case. As to an average value of distances Lf of the deformed portion, the deformation information calculation unit 113 obtains distances of the edges Af in FIG. 16B from the dashed line Bf at constant intervals and calculates the average value thereof as a deformation amount.

On-screen soft object deformation information is exemplified by the motion information indicated in FIG. 5.

It is possible to adopt any one of various methods in a case where there are both the distance $L_1$ in FIG. 14C and the distance $L_2$ in FIG. 15C. According to a first one of the methods, the deformation information calculation unit 113 obtains a sum of the distance $L_1$ and the distance $L_2$ as a deformation amount. The deformation information calculation unit 113 calculates a large deformation amount in this method, which is thus effective in a case where the operator 1 performs a task while watching change of the distance $L_1$ and the distance $L_2$. According to a second one of the methods, the deformation information calculation unit 113 compares the distance $L_1$ and the distance $L_2$ and uses the larger one as a deformation amount. This method is effective in a case where the operator 1 performs a task while watching the larger deformation amount. Other than these methods, if the deformation information calculation unit 113 sets a threshold (e.g. 1 mm) to calculate a deformation amount and determines that the deformation amount does not exceed the threshold, the deformation information calculation unit 113 is capable of assuming the deformation amount as zero while avoiding a measurement error or an estimation error for the calculation of the deformation amount.

Still alternatively, the deformation information calculation unit 113 is capable of obtaining a deformation degree and then calculating on-screen soft object deformation information. The example of FIG. 15C is described with reference to FIG. 17.

Figure 17:
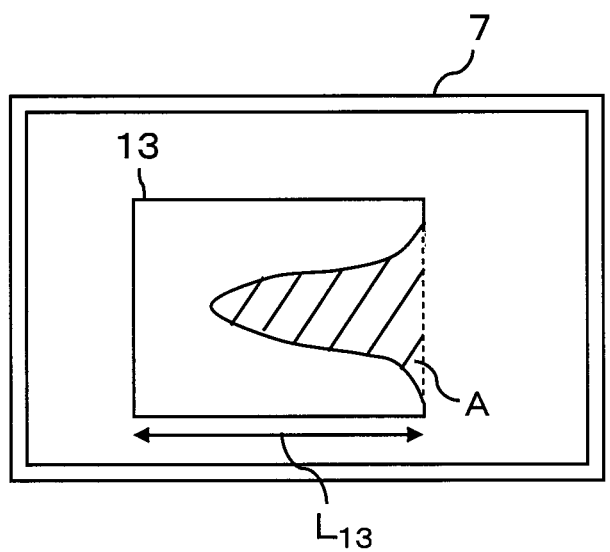
FIG. 17 is an explanatory view of a deformation degree in the master slave robot according to the first embodiment of the present invention.

In FIG. 17, the deformation information calculation unit 113 initially calculates, as a deformation degree, a percentage of an area A of a deformed portion indicated by oblique lines to an area of the soft target article 13 prior to the deformation.

The deformation information calculation unit 113 subsequently multiplies a length $L_{13}$ of the undeformed soft target article 13 and the calculated deformation degree to calculate on-screen soft object deformation information. When the deformation information calculation unit 113 calculates the deformation degree in this manner, the deformation information calculation unit 113 is capable of calculating on-screen soft object deformation information even in a case where the length of the deformed portion cannot be measured accurately.

Also described is a difference between use of on-screen slave motion information and use of on-screen soft object deformation information. It is necessary to perform picture processing in order to calculate on-screen soft object deformation information. If the deformation information calculation unit 113 determines that the control apparatus 104 for the master arm 2 is incapable of performing picture processing, the deformation information calculation unit 113 uses on-screen slave motion information in place of on-screen soft object deformation information without complicated processing. Other than the above selection guideline, if the deformation information calculation unit 113 sets a threshold (e.g. 1 mm) to calculate a deformation amount and determines that the deformation amount does not exceed the threshold, the deformation information calculation unit 113 is capable of using on-screen slave motion information. In this manner, the deformation information calculation unit 113 is capable of selecting to use on-screen slave motion information in a case where a deformation amount is hard to be measured. Still alternatively, the deformation information calculation unit 113 is capable of setting the threshold and performing automatic selection.

(iii) When calculating both on-screen slave motion information and on-screen soft object deformation information.

The deformation information calculation unit 113 calculates on-screen slave motion information and on-screen soft object deformation information in the manners similar to those described above. When on-screen slave motion information, on-screen soft object deformation information, and deformation information to be obtained are denoted by $x_s$, $x_f$, and x, respectively, the deformation information calculation unit 113 calculates $x=ax_s+bx_f$ as a weighted average between the on-screen slave motion information and the on-screen soft object deformation information to generate the deformation information. In this equation, "a" and "b" are weighting gains, which are set by the deformation information calculation unit 113 so that a+b=1 is established. The percentage of the on-screen slave motion information increases when the weighting gain "a" has a larger value, whereas the percentage of the on-screen soft object deformation information increases when the weighting gain "b" has a larger value. The operator 1 inputs values of the weighting gains "a" and "b" to the deformation information calculation unit 113 through the master input/output IF 119.

The calculated deformation information is exemplified by the motion information indicated in FIG. 5.

When the deformation information calculation unit 113 selects at least one of the on-screen slave motion information and the on-screen soft object deformation information as information to be used as deformation information, the operator 1 inputs the information to be used as deformation information to the deformation information calculation unit 113 through the master input/output IF 119.

The deformation information calculation unit 113 transmits, to the force information correcting unit 114, at least one of the on-screen slave motion information and the on-screen soft object deformation information thus calculated, and time information.

A display unit 126 receives imaged picture information transmitted from the deformation information calculation unit 113. The display unit 126 causes the received imaged picture information to be projected on the display 7.

(Force Information Correcting Unit 114)

The force information correcting unit 114 receives master motion information and time information from the master motion information acquiring unit 110, at least one of on-screen slave motion information and on-screen soft object deformation information as well as time information from the deformation information calculation unit 113, and force information and time information from a force information acquiring unit 117. The force information correcting unit 114 corrects the force information in accordance with the master motion information and at least one of the on-screen slave motion information and the on-screen soft object deformation information thus acquired.

A method of correcting force information is described. The force information correcting unit 114 initially obtains a shift amount $d_b$ of a position and orientation in each sampling period from the master motion information acquired by the force information correcting unit 114. Similarly, the force information correcting unit 114 obtains a deformation amount $d_d$ of the soft object from the deformation information (at least one of the on-screen slave motion information and the on-screen soft object deformation information) acquired by the force information correcting unit 114. For example, in the case of FIG. 14C, when the soft object 8 gripped by the slave robot 103 is 3 cm long, if the slave arm 3 is shifted by 1 cm and the soft object 8 is shrunk to 2 cm long, the deformation amount (shift amount) $d_d$ is 1 cm. In the case of FIG. 15C, the length and the area in the deformed range in the soft target article 13 correspond to the deformation amount $d_d$ (shift amount $d_d$). The force information correcting unit 114 obtains a ratio between the shift amount $d_b$ and the deformation amount $d_d$ thus obtained, multiplies the obtained value and a gain, and multiplies the obtained value and the acquired force information, to modify the force information. The force information correcting unit 114 obtains the ratio between the shift amount and the deformation amount by calculating $d_b/d_d$. In short, the force information correcting unit 114 calculates the shift amount $d_b$ of the master arm 2 from the master motion information. The force information correcting unit 114 subsequently obtains the deformation amount $d_d$ of the soft object calculated by the deformation information calculation unit 113, and divides the shift amount $d_b$ by the deformation amount $d_d$. The force information correcting unit 114 then multiplies the division result ($d_b/d_d$) by a correction coefficient and the force information to generate corrected force information.

In the case of performing the task of inserting the fine component 8 as shown in FIG. 1, in an example, the task is performed with the magnification percentage of the imaging device 6 being changed. For example, in the step of shifting the fine component 8 to an insertion position, the task is roughly performed while interference with a peripheral jig or the like being checked. The task is thus performed while a picture is being reduced in this case. In the step of the inserting task, the task is performed while the state of the fine component 8 or the connector 9 being finely checked. The task is thus performed while the picture is being enlarged in this case. The cases of enlarging and reducing the picture are described below with reference to the drawings, respectively.

Figure 18:
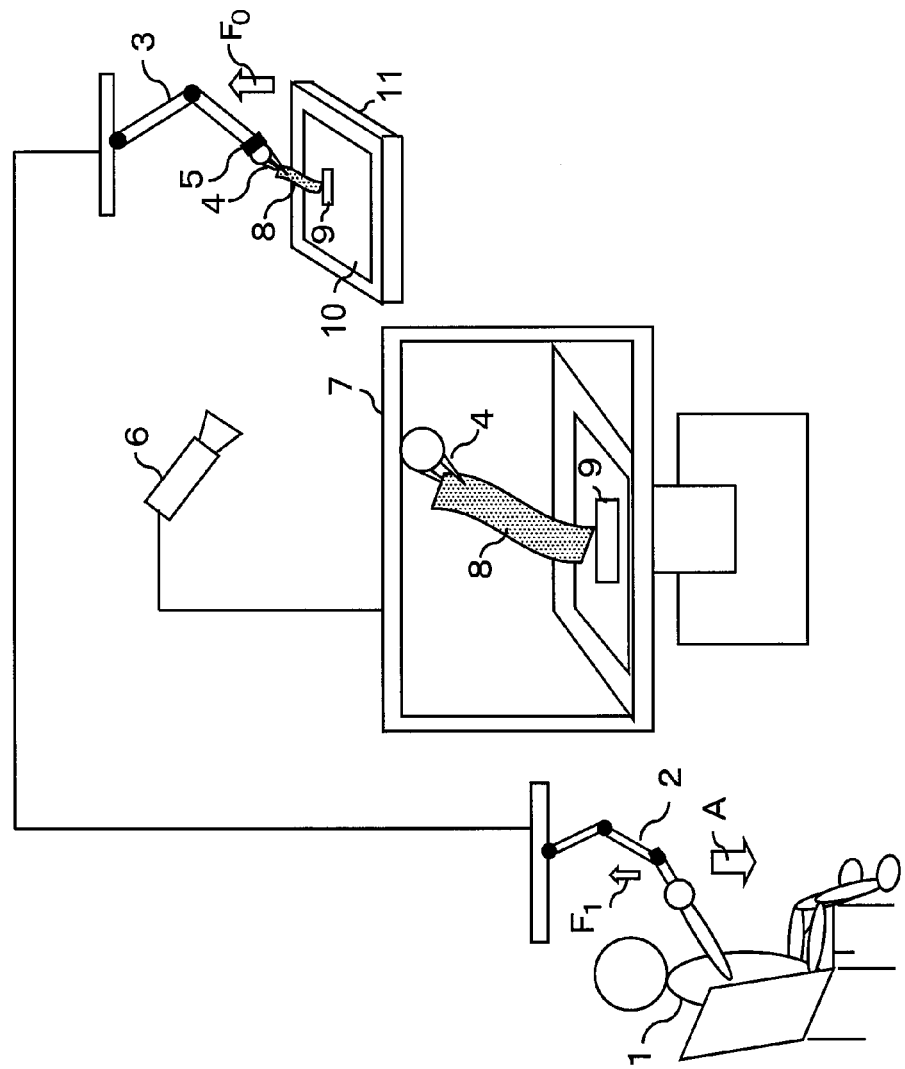
FIG. 18 is an explanatory view of a force correction method for a case of performing a task with enlargement in the master slave robot according to the first embodiment of the present invention.

(I) When performing task while enlarging picture:

The case of performing the task while enlarging the picture is described with reference to FIG. 18. In FIG. 18, a picture enlarged and imaged by the imaging device 6 is projected on the display 7. The operator 1 manipulates the master arm 2 to perform the task while watching the picture. The operator 1 performs the task while watching the hand 7 or the fine component 8 being enlarged in this manner, so that a deformation amount of the fine component 8 appears to the operator 1 as being problematically larger. Accordingly, the operator 1 thus fails to apply force necessary for insertion to the master arm 2 and possibly fails to firmly insert the fine component 8. In view of such a problem, the force information correcting unit 114 corrects by multiplying the obtained ratio ($d_b/d_d$) and the force information to present force to the operator 1 in accordance with the corrected information. Force ($F_1$ in FIG. 18) smaller than the force information ($F_0$ in FIG. 18) acquired by the force sensor 5 is accordingly presented to the operator 1 by means of the master arm 2 and the display 7. The operator 1 thus determines that a contact degree is small and intends to contact the fine component 8 to the connector 9 with larger force. The operator 1 is capable of applying force necessary for insertion to the master arm 2 in this case. As in this exemplary case of performing the task requiring application of force appropriate for the task, it is possible to apply appropriate force in accordance with deformation information by obtaining the ratio $d_b/d_d$.

Figure 19:
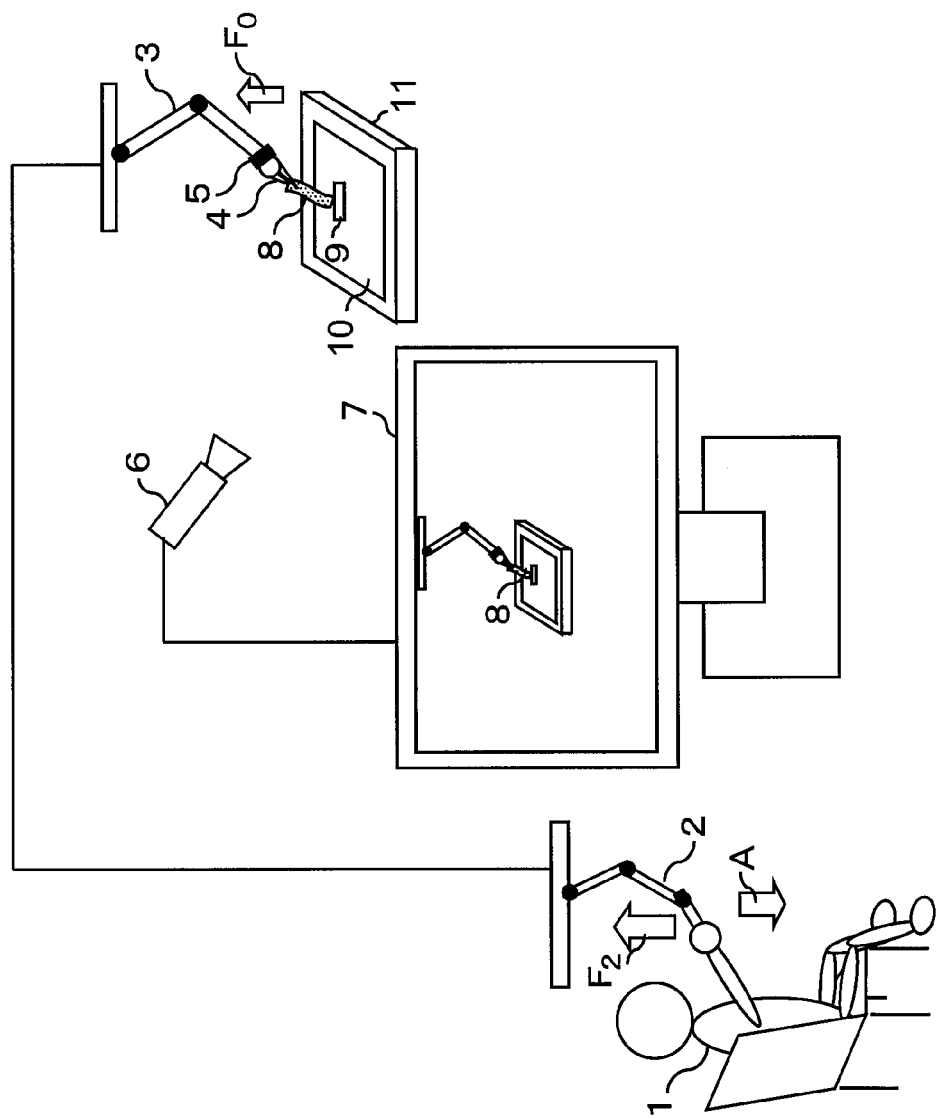
FIG. 19 is an explanatory view of a force correction method for a case of performing a task with reduction in the master slave robot according to the first embodiment of the present invention.

(II) When performing task while reducing picture:

The case of performing the task while reducing the picture is described with reference to FIG. 19. In FIG. 19, a picture reduced and imaged by the imaging device 6 is projected on the display 7. The operator 1 manipulates the master arm 2 to perform the task while watching the picture. The operator 1 performs the task while watching the hand 7 or the fine component 8 being reduced in this manner, so that a deformation amount of the fine component 8 appears to the operator 1 as being problematically too smaller. The operator 1 thus applies force more than necessary for the task and possibly applies an excessive load to the fine component 8 or the connector 9. In view of such a problem, the force information correcting unit 114 corrects by multiplying the obtained ratio ($d_b/d_d$) and the force information to present force to the operator 1 by means of the master arm 2 and the display 7. Force ($F_2$ in FIG. 19) larger than the force information ($F_0$ in FIG. 19) acquired by the force sensor 5 is presented in this case. The operator 1 thus determines that a contact degree is large and intends to contact the fine component 8 to the connector 9 with smaller force. The operator 1 is capable of applying force not causing an excessive load to the master arm 2 in this case. As in this exemplary case of performing the task that does not accept application of an excessive load, it is possible to apply appropriate force in accordance with the deformation information by obtaining the ratio $d_b/d_d$.

The force information correcting unit 114 multiplies the ratio ($d_b/d_d$) thus obtained and a gain α and multiplies an obtained value and the acquired force information to generate corrected force information. The operator 1 is capable of inputting a selected method of obtaining the ratio or the gain α to the force information correcting unit 114 through the master input/output IF 119.

The force information correcting unit 114 transmits the corrected force information thus generated and time information to the force information presentation unit 115.

As to timing of force correction, the force information correcting unit 114 performs force correction from the start to the end of the task. The force information correcting unit 114 is alternatively capable of determining whether or not to perform force correction in accordance with the obtained ratio ($d_b/d_d$). In an example, the force information correcting unit 114 can perform correction if the force information correcting unit 114 determines that the obtained ratio ($d_b/d_d$) exceeds a certain range (0.8 to 1.2), whereas the force information correcting unit 114 can perform no correction if the force information correcting unit 114 determines that the obtained ratio is within the range. The force information correcting unit 114 determines whether or not to perform force correction in accordance with the provided range to avoid the influence of a measurement error or an estimation error. The force information correcting unit 114 is thus capable of performing correction when performing a task requiring force correct.

Figure 20:
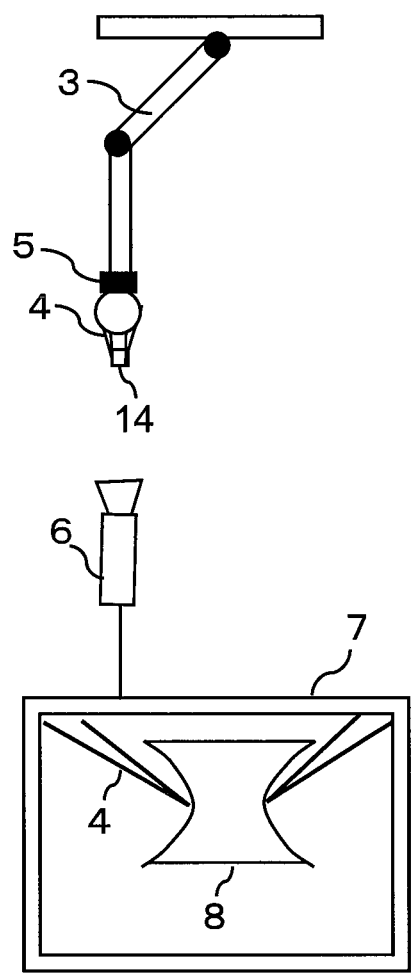
FIG. 20 is an explanatory view of an example of a force correction method for a case of performing a task with enlargement in the master slave robot according to the first embodiment of the present invention.
Figure 21:
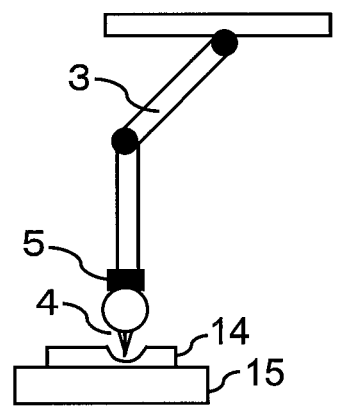
FIG. 21 is an explanatory view of an example of a force correction method for a case of performing a task with reduction in the master slave robot according to the first embodiment of the present invention.
Figure 21:
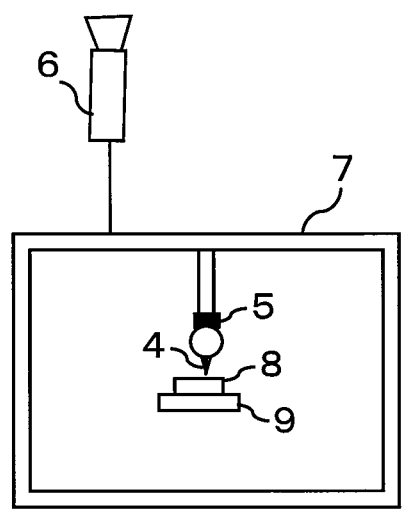

In an example of applying force correction to a different task, the cases of enlarging and reducing the picture are described with reference to FIGS. 20 and 21.

(III) When performing task while enlarging picture:

The case of performing the task while enlarging the picture is described with reference to FIG. 20. In the task shown in FIG. 20, the hand 4 of the slave arm 3 grips and conveys a soft target object 14. In this case, a picture enlarged and imaged by the imaging device 6 is projected on the display 7. The operator 1 manipulates the master arm 2 to perform the task while watching the picture. The operator 1 performs the task while watching the hand 4 or the soft target object 14 being enlarged in this manner, so that a deformation amount of the soft target object 14 appears to the operator 1 as being problematically larger. The operator 1 thus fails to apply necessary gripping force to the master arm 2 and the hand 4 possibly fails to firmly grip the soft target object 14. In view of such a problem, the force information correcting unit 114 corrects by multiplying the obtained ratio ($d_b/d_d$) and the force information to present force to the operator 1 by means of the master arm 2 and the display 7. Force smaller than the force information acquired by the force sensor 5 is presented in this case. The operator 1 thus determines that a contact degree is small and intends to contact the fine component 8 to the connector 9 with larger force. The operator 1 is capable of applying necessary gripping force to the master arm 2 in this case. As in this exemplary case of performing the task requiring application of force appropriate for the task, it is possible to apply appropriate force in accordance with deformation information by obtaining the ratio $d_b/d_d$.

(IV) When performing task while reducing picture:

The case of performing the task while reducing the picture is described with reference to FIG. 21. In the task shown in FIG. 21, the hand 4 of the slave arm 3 affixes the soft target object 14 to a hard target article 15. In this case, a picture reduced and imaged by the imaging device 6 is projected on the display 7. The operator 1 manipulates the master arm 2 to perform the task while watching the picture. The operator 1 performs the task while watching the hand 4 or the soft target object 14 being reduced in this manner, so that a deformation amount of the soft target object 14 appears to the operator 1 as being problematically too smaller. The operator 1 thus applies force more than necessary for the affixing task and possibly applies an excessive load to the soft target object 14 or the hard target article 15. In view of such a problem, the force information correcting unit 114 corrects by multiplying the obtained ratio ($d_b/d_d$) and the force information to present force to the operator 1 by means of the master arm 2 and the display 7. Force larger than the force information acquired by the force sensor 5 is presented in this case. The operator 1 thus determines that a contact degree is large and intends to contact the soft target object 14 to the hard target article 15 with smaller force. The operator 1 is capable of applying force not causing an excessive load to the master arm 2 in this case. As in this exemplary case of performing the task that does not accept application of an excessive load, it is possible to apply appropriate force in accordance with the deformation information by obtaining the ratio $d_b/d_d$.

The force information correcting unit 114 corrects magnitude of force information in this case. The force information correcting unit 114 is alternatively capable of correcting an update period of force information. Force information is updated in each constant period (e.g. 1 msec) in the above case. The force information correcting unit 114 is alternatively capable of changing to shorten or extend the update period. Specifically, when force information is expected to increase in magnitude, the force information correcting unit 114 extends the update period of force information without changing the magnitude of the force information. More particularly when force information is expected to be doubled, the update period can be extended to be doubled, for example. In contrast, when force information is expected to decrease in magnitude, the force information correcting unit 114 shortens the update period of force information without changing the magnitude of the force information. More particularly when force information is expected to be halved, the update period can be shortened to be halved, for example.

Figures 22, 23:
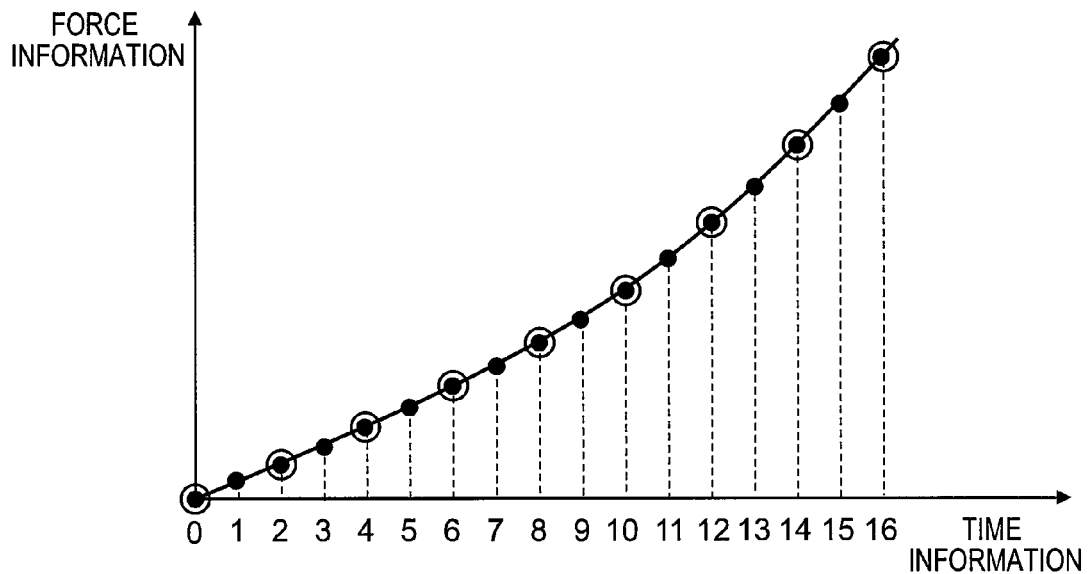
FIG. 22 is an explanatory graph of change in update period of force information in the master slave robot according to the first embodiment of the present invention.
FIG. 23 is a data chart of force information and time information on the master slave robot according to the first embodiment of the present invention.

Described with reference to the graph in FIG. 22 is why change in update period of force information effects similarly to change in magnitude of the force information. FIG. 22 includes chronological data of force information, with the transverse axis indicating time information and the ordinate axis indicating the force information. Numerical values on the transverse axis indicate time information. As to force information, black circles indicate data having the update period of 1 msec, whereas white circles indicate data having the update period of 2 msec. When force information is denoted by $F_k$, k=1, 2, 3, . . . is applicable if the update period is 1 msec, whereas k=2, 4, 6, . . . is applicable if the update period is 2 msec. Displacement of the force information in each update period is denoted by $\Delta F_k$. For example, when the time information is two, the force information correcting unit 114 calculates displacement $\Delta F_2 = F_2 - F_1$ in each update period of the force information if the update period is 1 msec, whereas the force information correcting unit 114 calculates displacement $\Delta F_2 = F_2 - F_0$ if the update period is 2 msec. The displacement $\Delta F_2$ of the force information with the update period of 2 msec is larger than the displacement $\Delta F_2$ with the update period of 1 msec. Displacement of force information is increased if an update period is extended as in this example, so that the operator 1 senses as if the force information is increased. It is because the operator 1 senses displacement of force when sensing force.

In this manner, in order to modify force information, the force information correcting unit 114 is alternatively capable of not correcting magnitude of the force information but correcting the update period of the force information. The magnitude of the force information is not changed upon correction, so that the force information can be prevented from changing too largely. Also in a system in which magnitude of force information cannot be corrected, it is possible to achieve an effect similar to that of correcting the magnitude of the force information.

As to a degree of correction of force information, the force information is expressed as being increased or decreased with a reference case where the magnification percentage is one and the force information is regarded as corrected force information with no correct.

Such a reference value can be set by performing calibration prior to the task. Specifically, the operator 1 manipulates the master arm 2 before performing the task to set the reference value. Force information is corrected during manipulation and corrected force information with a correction amount enabling appropriate operation is set as the reference value. The operator 1 is capable of inputting the reference value through the master input/output IF 119. Such calibration absorbs personal differences, differences among master arms, and the like.

It is possible to set a threshold of an upper or lower limit value for a correction amount upon generating corrected force information. The operator 1 is capable of inputting the threshold through the master input/output IF 119. The threshold thus set prevents the operator 1 from sensing no force due to too much decreased corrected force information, or from failing to bear large force due to too much increased corrected force information.

It is also possible to select any one of various correction methods including linear correction as well as a polynomial, a hyperbola, and a logarithm. The operator 1 is capable of selecting one of the correction methods through the master input/output IF 119. It is possible to cope with a case where force perception of the operator 1 does not change linearly by selecting one of the correction methods.

It is also possible to change a correction amount in accordance with hardness or softness of a target object. Such hardness of the target object is detected by means of a material for the target object or the like and the correction amount is adjusted in accordance with the hardness. For example, the correction amount is increased as the target object is softer. Such adjustment of the correction amount enables a uniform task regardless of hardness or softness of a target object.

(Force Information Presentation Unit 115)

The force information presentation unit 115 receives corrected force information and time information from the force information correcting unit 114. The force information presentation unit 115 generates a command value used for outputting the corrected force information from the master arm 2 so as to present to the operator 1 the corrected force information thus acquired by means of the master arm 2.

A method of generating a command value is described. In a case of using, as the master arm 2, an arm of which force is controllable, the force information presentation unit 115 uses corrected force information itself as a command value. In a case of using, as the master arm 2, an arm of which force is uncontrollable but of which position is controllable, the force information presentation unit 115 converts corrected force information to position information in accordance with the Hook's law. The force information presentation unit 115 uses the converted position information as a command value.

The force information presentation unit 115 transmits the generated command value for the master arm 2 in each sampling period, to the master arm 2 by way of the master input/output IF 119 and a master motor driver 120.

<Description of Slave Control Apparatus Main Body>

The slave control apparatus main body 107 includes the slave motion information acquiring unit 116, the force information acquiring unit 117, and the slave controller 118.

(Slave Motion Information Acquiring Unit 116)

The slave motion information acquiring unit 116 receives position information and orientation information on the slave arm 3 from a slave input/output IF 121, and time information from a timer incorporated in the slave input/output IF 121. The slave motion information acquiring unit 116 acquires velocity information by differentiating the position information with respect to the time information, which are acquired from the slave input/output IF 121. The slave motion information acquiring unit 116 acquires angular velocity information by differentiating the orientation information with respect to the time information. The slave motion information acquiring unit 116 acquires time information, position information, orientation information, velocity information, and angular velocity information, which are in forms similar to those in FIG. 5.

The slave motion information acquiring unit 116 transmits the position information, the orientation information, the velocity information, and the angular velocity information on the slave arm 3, as well as the time information thus acquired, to the deformation information calculation unit 113. The position information, the orientation information, the velocity information, and the angular velocity information configure motion information (slave motion information) on the slave arm 3.

(Force Sensor 5)

As shown in FIG. 1, the force sensor 5 is located at the wrist of the hand 4 of the slave arm 3 and measures reactive force generated when the target object is in contact with the target article. Used in this case is a force sensor that is capable of measuring totally six axes including three force axes and three torque axes. It is possible to use any force sensor that is capable of measuring one or more axes. The force sensor 5 is embodied by adopting a strain gauge force sensor or the like.

Force information measured by the force sensor 5 is transmitted to the force information acquiring unit 117.

(Force Information Acquiring Unit 117)

The force information acquiring unit 117 receives force information from the force sensor 5 and time information from the timer incorporated in the slave input/output IF 121. FIG. 23 indicates force information and time information. The force information acquiring unit 117 is also capable of acquiring force information from the force sensor 5 by way of the slave input/output IF 121.

The force information acquiring unit 117 transmits the force information and the time information thus acquired to the force information correcting unit 114.

(Slave Controller 118)

The slave controller 118 receives corrected master motion information and time information from the master motion information correcting unit 112. The slave controller 118 generates a command value for shifting the slave arm 3 in accordance with the corrected master motion information thus acquired.

Described below is how the slave controller 118 generates a command value. The corrected master motion information acquired by the slave controller 118 is information relating to a shift amount of the hand 4. The slave controller 118 initially calculates a position and an orientation shifted by the acquired shift amount in the coordinate system of the hand 4 of the slave arm 3. The slave controller 118 converts the position and the orientation thus calculated by the slave controller 118 in the coordinate system of the hand 4 to a position and an orientation in the base coordinate system of the slave arm 3. The slave controller 118 subsequently generates a command value for shifting to the position and the orientation in the base coordinate system of the slave arm 3 thus converted.

The slave controller 118 transmits the generated command value for the slave arm 3 in each sampling period, to the slave arm 3 by way of the slave input/output IF 121 and a slave motor driver 122.

<Description of Master Peripheral Device>

The master peripheral device 108 includes the master input/output IF 119 and the master motor driver 120.

(Master Input/Output IF 119)

Figure 24:
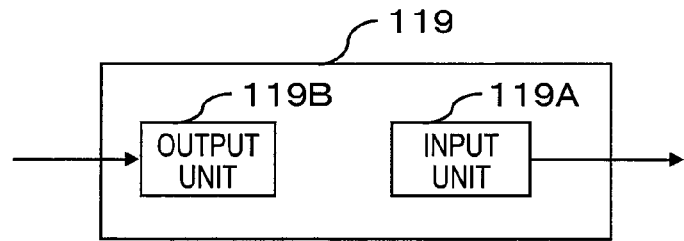
FIG. 24 is a block diagram of a master input/output IF in the master slave robot according to the first embodiment of the present invention.

The master input/output IF 119 transmits the command value received from the force information presentation unit 115 to the master motor driver 120. The master input/output IF 119 obtains position information and orientation information on the master arm 2 from the value received from an encoder of each joint shaft of the master arm 2 at a calculating unit (not shown) in the encoder, and transmits, from the master input/output IF 119 to the master motion information acquiring unit 110, the position information, the orientation information, and time information from the timer incorporated in the master input/output IF 119. The time information from the timer incorporated in the master input/output IF 119 is transmitted to the imaging information acquiring unit 111. As shown in FIG. 24, the master input/output IF 119 includes an input unit 119A and an output unit 119B. The input unit 119A configures an input IF, and is used when the operator 1 selects an item using a keyboard, a mouse, a touch panel, a sound input device, or the like, when the operator 1 inputs a number using a keyboard, a mouse, a touch panel, a sound input device, or the like, for example. The output unit 119B configures an output IF, and is used when acquired information or the like is outputted, when the information is projected on the display 7, or the like, for example.

(Master Motor Driver 120)

The master motor driver 120 transmits, to the master arm 2, a command value for a motor of each joint shaft in the master arm 2 in order to control the master arm 2 in accordance with the command value acquired from the master input/output IF 119.

<Description of Slave Peripheral Device>

The slave peripheral device 109 includes the slave input/output IF 121 and the slave motor driver 122.

(Slave Input/Output IF 121)

The slave input/output IF 121 transmits the command value received from the slave controller 118 to the slave motor driver 122. The slave input/output IF 121 obtains position information and orientation information on the slave arm 3 from the value received from an encoder of each joint shaft of the slave arm 3 at a calculating unit (not shown) in the encoder, and transmits, from the slave input/output IF 121 to the slave motion information acquiring unit 116, the position information, the orientation information, and time information from the timer incorporated in the slave input/output IF 121. The time information from the timer incorporated in the slave input/output IF 121 is transmitted to the force information acquiring unit 117. Similarly to the master input/output IF 119, the slave input/output IF 121 includes an input unit 121A and an output unit 121B that are configured as shown in FIG. 24. The input unit 121A configures an input IF, and is used when the operator 1 selects an item using a keyboard, a mouse, a touch panel, a sound input device, or the like, when operator 1 inputs a number using a keyboard, a mouse, a touch panel, a sound input device, or the like, for example. The output unit 121B configures an output IF, and is used when acquired information or the like is outputted, when the information is projected on the display 7, or the like, for example.

(Slave Motor Driver 122)

The slave motor driver 122 transmits, to the slave arm 3, a command value for a motor of each joint shaft in the slave arm 3 in order to control the slave arm 3 in accordance with the command value acquired from the slave input/output IF 121.

<Description of Master Arm 2>

In the master arm 2, the calculating unit in each encoder of the master arm 2 obtains motion information on the master arm 2 at a constant time interval (e.g. every 1 msec) using the timer incorporated in the master input/output IF 119. The motion information thus obtained is transmitted to the master input/output IF 119. The master arm 2 is controlled in accordance with a command value from the master motor driver 120.

The master arm 2 includes the motor and the encoder at each joint, so as to be controlled to a position and an orientation as desired. In this case, the master arm 2 configures a multiple link manipulator of six degrees of freedom, which has six joints. The number of joints and the degrees of freedom of the master arm 2 are not limited to those of the first embodiment, but can be any numbers equal to one or more.

<Description of Slave Arm>

In the slave arm 3, the calculating unit in each encoder of the slave arm 3 obtains motion information on the slave arm 3 at a constant time interval (e.g. every msec) using the timer incorporated in the slave input/output IF 121. The motion information thus obtained is transmitted to the slave input/output IF 121. The slave arm 3 is controlled in accordance with a command value from the slave motor driver 122.

The slave arm 3 includes a motor and the encoder at each joint, so as to be controlled to a position and an orientation as desired. In this case, the slave arm 3 configures a multiple link manipulator of six degrees of freedom, which has six joints. The number of joints and the degrees of freedom of the slave arm 3 are not limited to those of the first embodiment, but can be any numbers equal to one or more.

<Flowchart>

A manipulation procedure of the master slave robot 100 according to the first embodiment is described with reference to the flowcharts in FIGS. 25 and 26.

Figure 25:
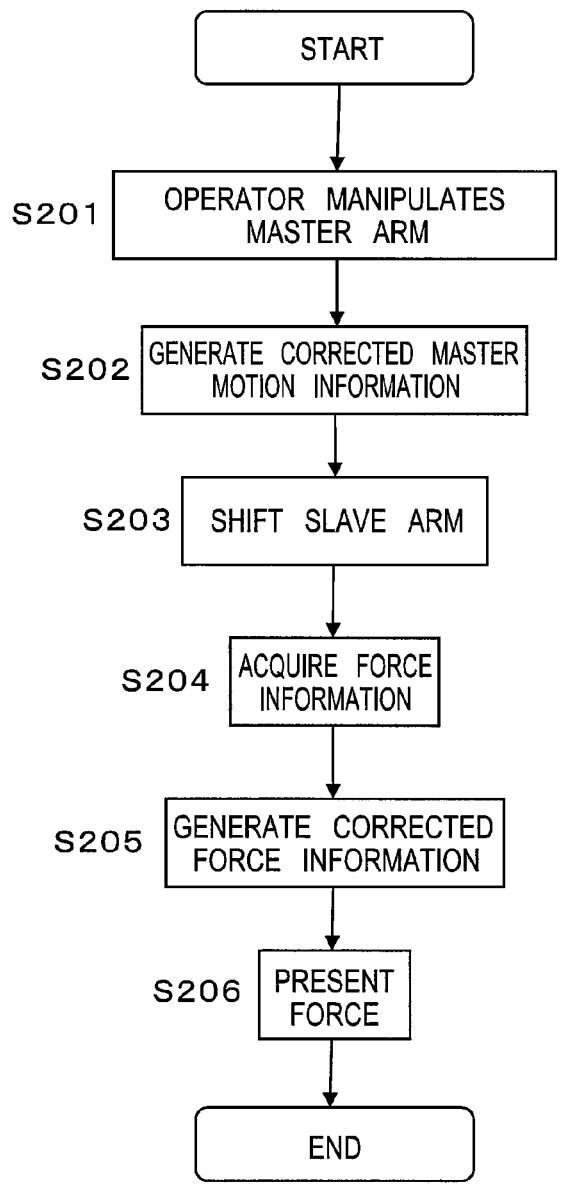
FIG. 25 is a flowchart of a manipulation procedure of the master slave robot according to the first embodiment of the present invention.

FIG. 25 exemplifies manipulation of the master slave robot 100 according to the first embodiment.

Initially in step S201, the operator 1 grips and manipulates the master arm 2 while watching a picture projected on the display 7. The flow then proceeds to step S202.

Subsequently in step S202, the master motion information correcting unit 112 corrects master motion information thus acquired and generates corrected master motion information for shifting the slave arm 3. The flow then proceeds to step S203.

Next, in step S203, the slave arm 3 shifts and performs a task Next, in accordance with the corrected master motion information thus acquired. The flow then proceeds to step S204.

Next, in step S204, the force sensor 4 attached to the arm tip of the slave arm 3 detects force information generated during the task, and the force information acquiring unit 117 acquires the detected force information. The flow then proceeds to step S205.

Next, in step S205, the force information correcting unit 114 corrects the force information acquired by the force information acquiring unit 117 in accordance with the master motion information and at least one of the on-screen slave motion information and the on-screen soft object deformation information to generate corrected force information. The flow then proceeds to step S206.

Next, in step S206, the master arm 2 presents force to the operator 1 in accordance with the corrected force information generated by the force information correcting unit 114. The series of the manipulation procedure ends at this stage.

Figure 26:
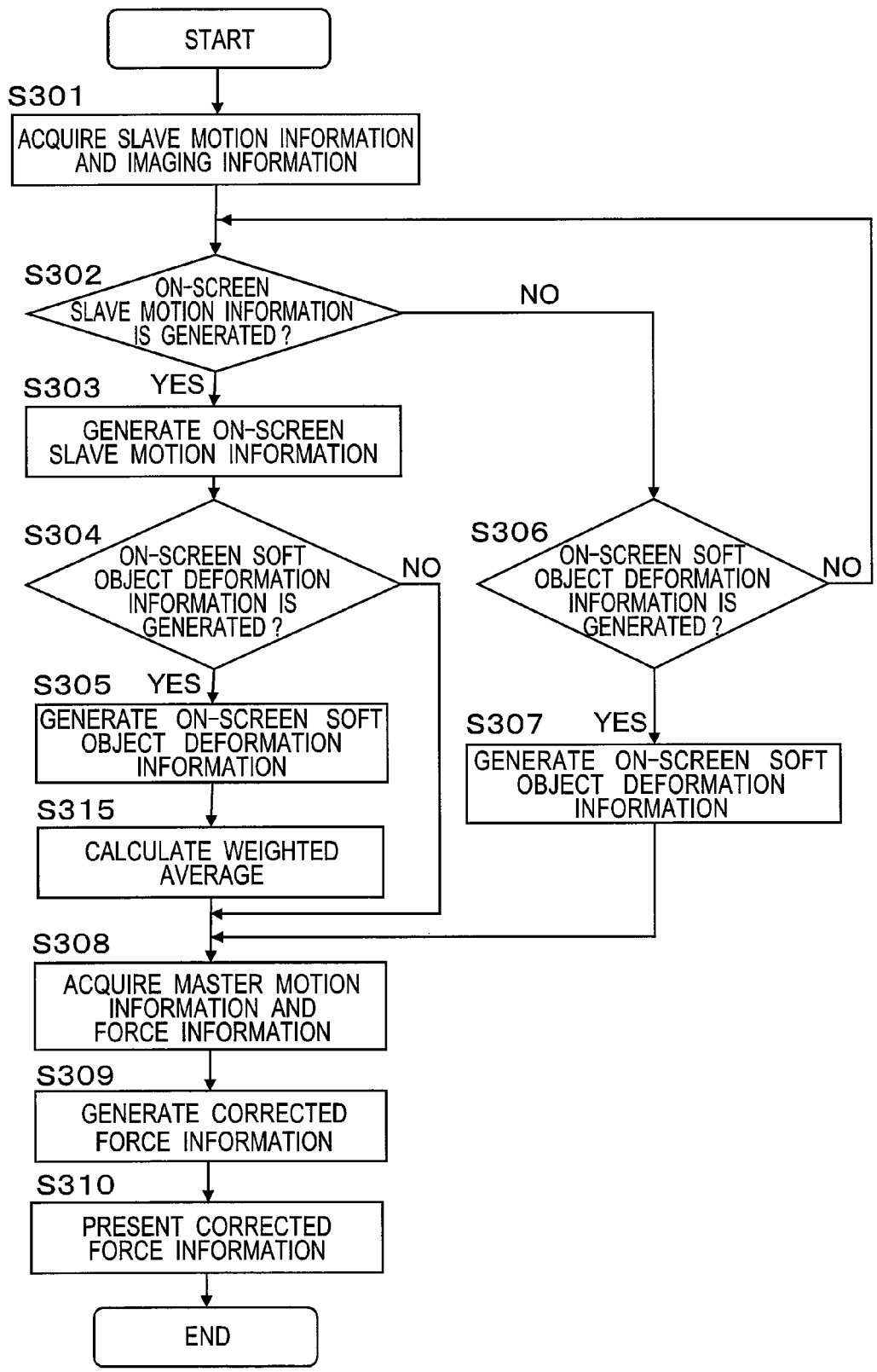
FIG. 26 is a flowchart of a force correction procedure of the master slave robot according to the first embodiment of the present invention.

Detailed with reference to FIG. 26 are force information acquisition in step S204, corrected force information generation in step S205, and force presentation in step S206 in the flowchart in FIG. 25.

Initially in step S301, the slave motion information acquiring unit 116 acquires slave motion information, and the imaging information acquiring unit 111 acquires imaging information. The flow then proceeds to step S302.

Subsequently in step S302, the deformation information calculation unit 113 selects whether or not to calculate on-screen slave motion information. The flow proceeds to step S303 if the deformation information calculation unit 113 selects to calculate on-screen slave motion information, whereas the flow proceeds to step S306 if the deformation information calculation unit 113 selects not to calculate on-screen slave motion information. According to an example of a determination (selection) reference in step S302, the flow proceeds to step S306 if the deformation information calculation unit 113 determines that the control apparatus 104 for the master arm 2 is capable of performing picture processing, whereas the flow proceeds to step S303 if the deformation information calculation unit 113 determines that the control apparatus 104 is incapable of performing picture processing. According to another example of a determination reference, the flow proceeds to step S303 if the deformation information calculation unit 113 determines that a deformation amount on the screen is small (the deformation amount is smaller than the threshold), whereas the flow proceeds to step S306 if the deformation information calculation unit 113 determines that the deformation amount on the screen is large (the deformation amount is larger than the threshold).

Next, in step S303, the deformation information calculation unit 113 generates on-screen slave motion information serving as motion information on the on-screen slave arm 3 in accordance with the slave motion information and the imaging information. The flow then proceeds to step S304.

Next, in step S304, the deformation information calculation unit 113 selects whether or not to calculate on-screen soft object deformation information. The flow proceeds to step S305 if the deformation information calculation unit 113 selects to calculate on-screen soft object deformation information, whereas the flow proceeds to step S308 if the deformation information calculation unit 113 selects not to calculate on-screen soft object deformation information.

Next, in step S305, the deformation information calculation unit 113 performs picture processing in accordance with the imaging information to generate on-screen soft object deformation information serving as deformation information on the on-screen soft object. The flow then proceeds to step S315.

Next, in step S315, the deformation information calculation unit 113 calculates a weighted average between the on-screen slave motion information and the on-screen soft object deformation information as deformation information. The flow then proceeds to step S308.

Next, in step S306, the deformation information calculation unit 113 selects whether or not to calculate on-screen soft object deformation information. The flow proceeds to step S307 if the deformation information calculation unit 113 selects to calculate on-screen soft object deformation information, whereas the flow returns to step S302 if the deformation information calculation unit 113 selects not to calculate on-screen soft object deformation information.

Next, in step S307, the deformation information calculation unit 113 performs picture processing in accordance with the imaging information to generate on-screen soft object deformation information serving as deformation information on the on-screen soft object. The flow then proceeds to step S308.

Next, in step S308, the master motion information acquiring unit 110 acquires master motion information and the force information acquiring unit 117 acquires force information. The flow then proceeds to step S309.

Next, in step S309, the force information correcting unit 114 multiplies the force information acquired from the force information acquiring unit 117 and a ratio between the master motion information and one of the on-screen slave motion information and the on-screen soft object deformation information to generate corrected force information that is corrected to on-screen information. The flow then proceeds to step S310.

Next, in step S310, the force information presentation unit 115 generates a command value for the master arm 2 in accordance with the corrected force information acquired from the force information correcting unit 114, and then, the master arm 2 presents force to the operator 1.

Effects of First Embodiment

The force information correcting unit 114 corrects force information in accordance with motion information or deformation information on the screen, and the force information presentation unit 115 presents force. The operator 1 is thus capable of applying force necessary for a task and performing the task accurately. In other words, it is possible to perform presentation of force corresponding to manipulation of the operator 1 and a motion picture watched by the operator 1, so that the picture watched by the operator 1 can be matched to the manipulation of the operator 1 with a less sense of incongruity. This allows the task to be performed accurately.

Second Embodiment

Figure 27:
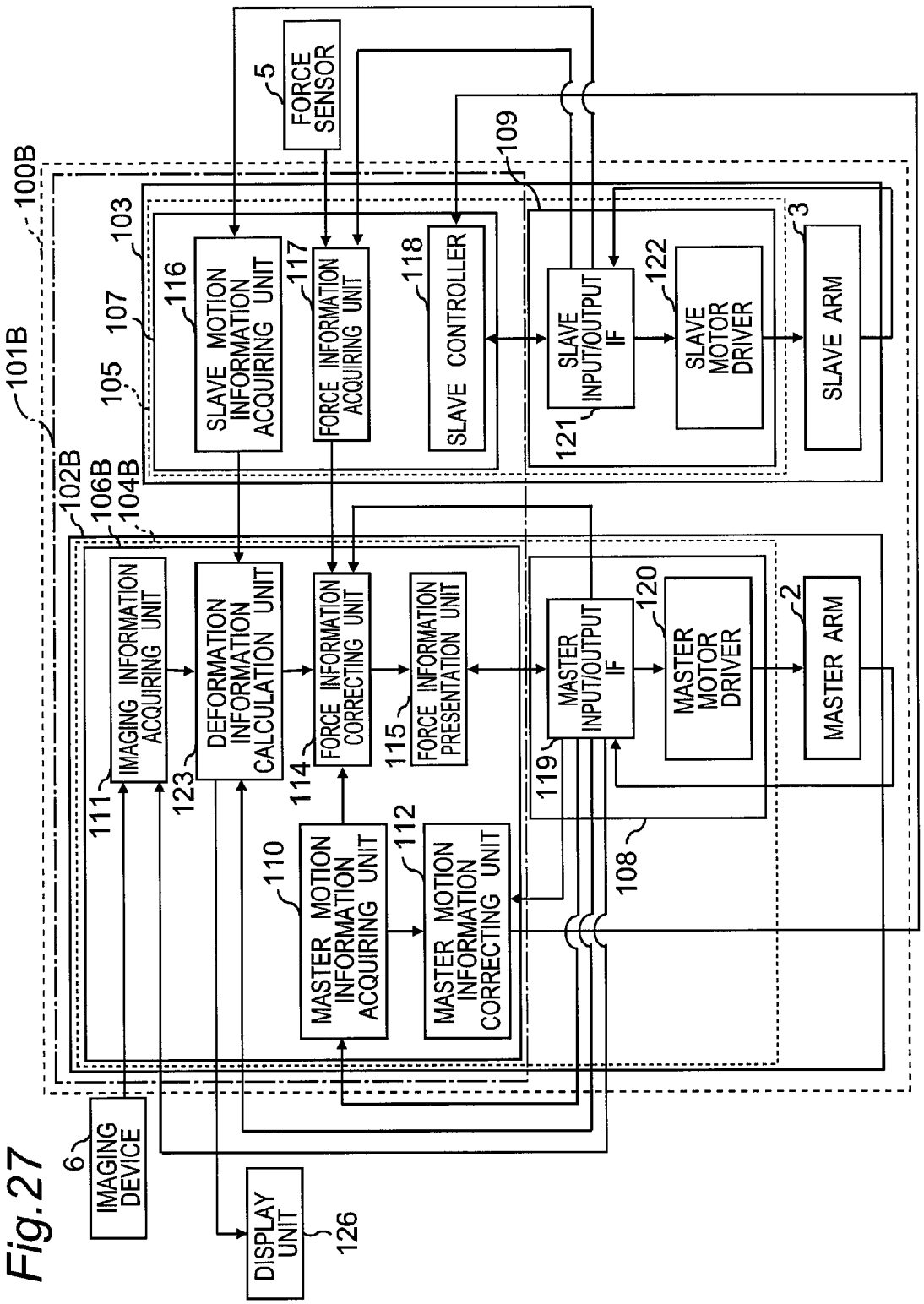
FIG. 27 is a block diagram of a master slave robot according to a second embodiment of the present invention.

Schematically described is a master slave robot 100B including a control apparatus 101B for the master slave robot 100B according to the second embodiment of the present invention. FIG. 27 is a block diagram of the master slave robot 100B according to the second embodiment of the present invention. In a master robot 102B according to the second embodiment of the present invention, the master arm 2, the master peripheral device 108, as well as the master motion information acquiring unit 110, the imaging information acquiring unit 111, the master motion information correcting unit 112, the force information correcting unit 114, and the force information presentation unit 115 in a master control apparatus 106B, and the slave robot 103 are configured similarly to those of the first embodiment. These common portions are denoted by the common reference signs and are not described repeatedly, and only different portions are to be detailed below.

(Deformation Information Calculation Unit 123)

A deformation information calculation unit 123 replaces the deformation information calculation unit 113 according to the first embodiment and is included in a control apparatus 104B for the master arm 2 so as to function as a display information acquiring unit according to another example. In addition to the functions of the deformation information calculation unit 113 according to the first embodiment, the deformation information calculation unit 123 has the functions of detecting a shape of a deformed soft object and calculating on-screen soft object deformation information in accordance with the shape.

Figure 28A:
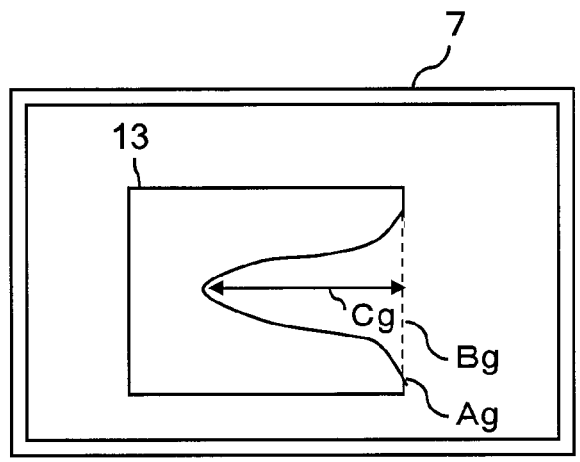
FIG. 28A is an explanatory view of a method of calculating on-screen soft object deformation information on the master slave robot according to the second embodiment of the present invention.

Described with reference to FIG. 28A is how the deformation information calculation unit 113 according to the first embodiment calculates on-screen soft object deformation information in the example of FIG. 15C. The deformation information calculation unit 113 detects an edge Ag of the soft target article 13 on the screen, and detects, as on-screen soft object deformation information, a deformed distance Cg (assuming the distance is $r_B$) from a undeformed edge Bg.

Figure 28B:
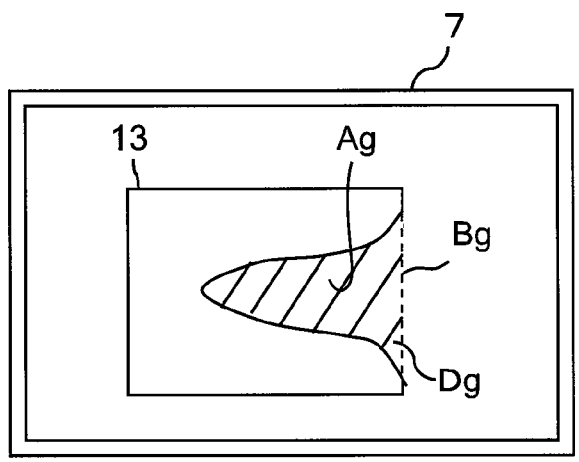
FIG. 28B is an explanatory view of a method of calculating on-screen soft object deformation information on the master slave robot according to the second embodiment of the present invention.

Described next with reference to FIG. 28B is how the deformation information calculation unit 123 according to the second embodiment calculates on-screen soft object deformation information.

Similarly to the case of FIG. 28A, the deformation information calculation unit 123 initially detects the edge Ag of the soft target article 13 on the screen, and detects the deformed distance Cg (assuming the distance is $r_B$) from the undeformed edge Bg.

The deformation information calculation unit 123 then detects a deformed area Dg (assuming the area is $S_D$) that is surrounded with the edge Bg of the undeformed soft target article 13 on the screen and the edge Ag of the deformed soft target article 13 on the screen. The deformation information calculation unit 123 also obtains an area Eg having a distance $Cg^2$ by $S_c = r_B^2$. The deformation information calculation unit 123 obtains a percentage of the deformed area Dg to the area Eg having the distance $Cg^2$ by $r_{DC} = S_D/S_C$. The deformation information calculation unit 123 divides the percentage by an arbitrary constant $a_{DC}$ (e.g. 0.5) so that the percentage is one with the constant $a_{DC}$. The operator 1 inputs the arbitrary constant to the deformation information calculation unit 123 through the master input/output IF 19. The deformation information calculation unit 123 calculates, as on-screen soft object deformation information, $r_a \cdot r_B$ that is obtained by multiplying the percentage $r_a = r_{DC}/a_{DC}$ thus obtained and the distance $r_B$.

Figure 29A:
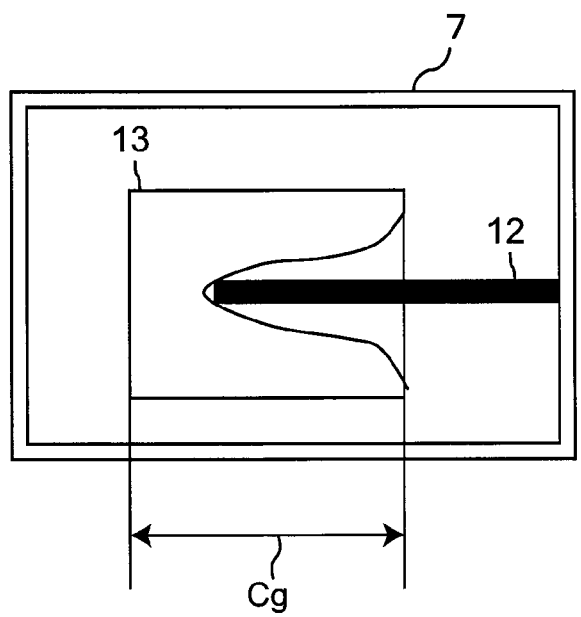
FIG. 29A is an explanatory view of an effect of the on-screen soft object deformation information with an area taken into consideration in the master slave robot according to the second embodiment of the present invention.
Figure 29B:
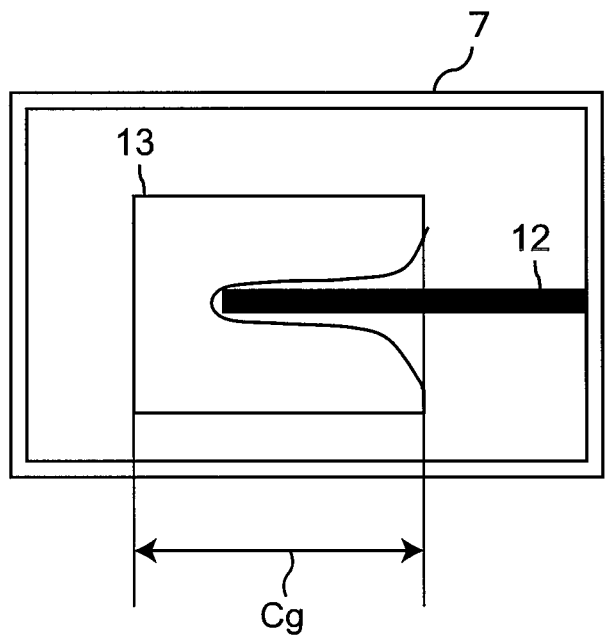
FIG. 29B is an explanatory view of an effect of the on-screen soft object deformation information with an area taken into consideration in the master slave robot according to the second embodiment of the present invention.

Effects of calculating a distance with an area taken into consideration at the deformation information calculation unit 123 in this manner are described with reference to FIGS. 29A and 29B. FIG. 29A and FIG. 29B have the same deformed distances Cg and the different deformed areas Dg. According to the method of calculating on-screen soft object deformation information at the deformation information calculation unit 113 of the first embodiment, the operator 1 receives similar force presentation in both of the cases. However, in an actual case, FIG. 29A is different from FIG. 29B in a manner of inserting the hard target object 12, damping of the soft target article 13, and the like. It is thus necessary to present different force information to the operator 1. Specifically, the deformed area in FIG. 29A is larger than that in FIG. 29B. The operator 1 thus senses the soft target article 13 as being softer in the case of FIG. 29A and completes the task while failing to apply necessary force. When the operator receives presentation of force information that is corrected to be smaller in the case of FIG. 29A, the operator 1 is capable of applying force necessary for the task. In this manner, a deformed area is taken into consideration as in the method of calculating on-screen soft object deformation information at the deformation information calculation unit 123 according to the second embodiment. It is thus possible to express a difference in material or in insertion manipulation by force presentation.

The display unit 126 receives imaged picture information transmitted from the deformation information calculation unit 123. The display unit 126 causes the received imaged picture information to be projected on the display 7.

<Flowchart>

Figure 30:
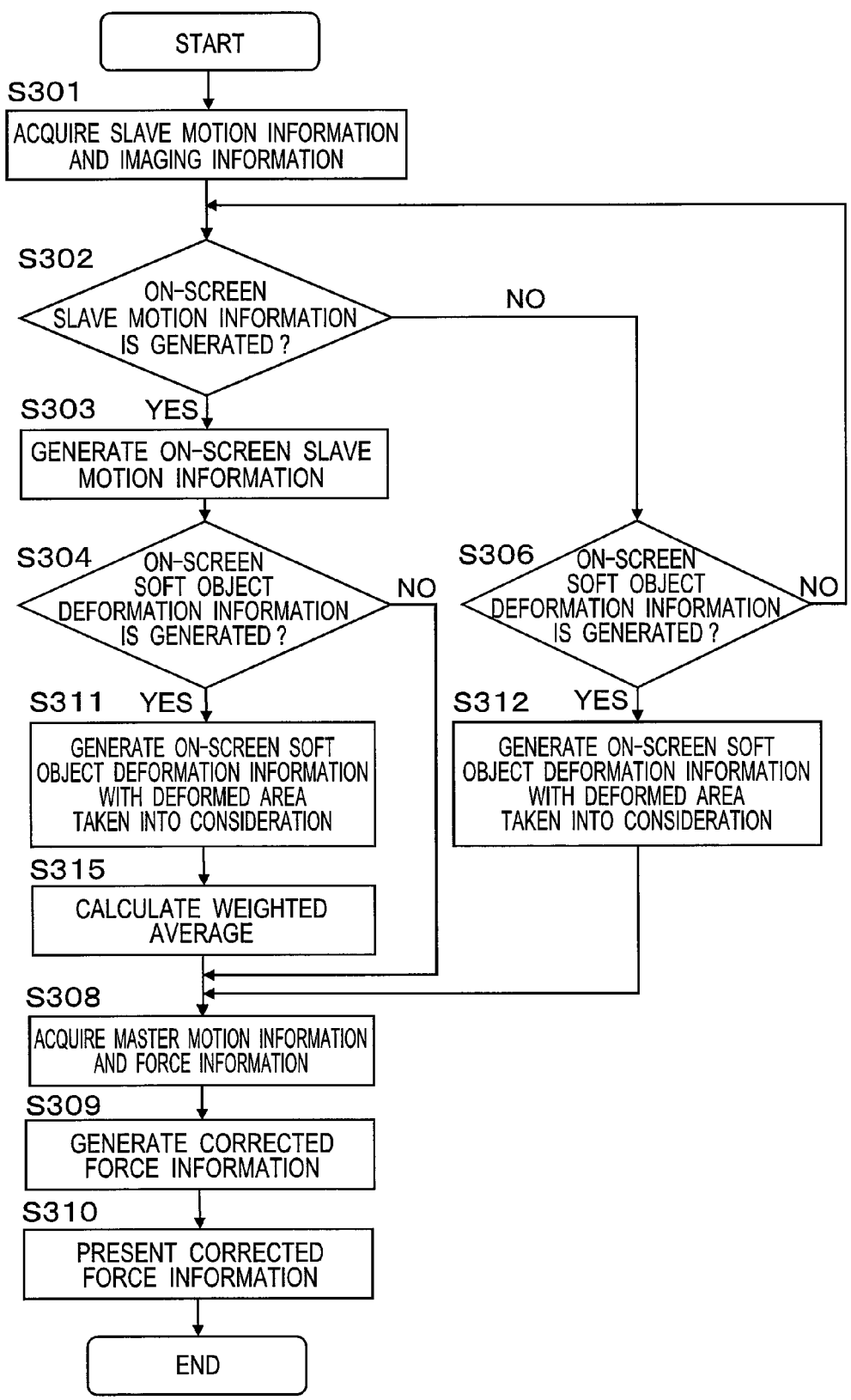
FIG. 30 is a flowchart of a force correction procedure of the master slave robot according to the second embodiment of the present invention.

A manipulation procedure of the master slave robot 100B according to the second embodiment is described with reference to the flowchart in FIG. 30.

An example of the manipulation of the master slave robot 100B according to the second embodiment is similar to the manipulation illustrated in FIG. 25. Described with reference to FIG. 30 are force information acquisition in step S204, corrected force information generation in step S205, and force presentation in step S206 in FIG. 25.

Initially in step S301, the slave motion information acquiring unit 116 acquires slave motion information, and the imaging information acquiring unit 111 acquires imaging information. The flow then proceeds to step S302.

Subsequently in step S302, the deformation information calculation unit 123 selects whether or not to calculate on-screen slave motion information. The flow proceeds to step S303 if the deformation information calculation unit 123 selects to calculate on-screen slave motion information, whereas the flow proceeds to step S306 if the deformation information calculation unit 123 selects not to calculate on-screen slave motion information. According to an example of a determination (selection) reference in step S302, the flow proceeds to step S306 if the deformation information calculation unit 123 determines that the control apparatus 104B for the master arm 2 is capable of performing picture processing, whereas the flow proceeds to step S303 if the deformation information calculation unit 123 determines that the control apparatus 104B is incapable of performing picture processing. According to another example of a determination reference, the flow proceeds to step S303 if the deformation information calculation unit 123 determines that a deformation amount on the screen is small (the deformation amount is smaller than the threshold), whereas the flow proceeds to step S306 if the deformation information calculation unit 123 determines that the deformation amount on the screen is large (the deformation amount is larger than the threshold).

Next, in step S303, the deformation information calculation unit 123 generates on-screen slave motion information serving as motion information on the on-screen slave arm 3 in accordance with the slave motion information and the imaging information. The flow then proceeds to step S304.

Next, in step S304, the deformation information calculation unit 123 selects whether or not to calculate on-screen soft object deformation information. The flow proceeds to step S311 if the deformation information calculation unit 123 selects to calculate on-screen soft object deformation information, whereas the flow proceeds to step S308 if the deformation information calculation unit 123 selects not to calculate on-screen soft object deformation information.

Next, in step S311, the deformation information calculation unit 123 performs picture processing in accordance with the imaging information to generate on-screen soft object deformation information with the deformed area of the on-screen soft object taken into consideration. The flow then proceeds to step S315.

Next, in step S315, the deformation information calculation unit 113 calculates a weighted average between the on-screen slave motion information and the on-screen soft object deformation information to generate the calculated weighted average as deformation information. The flow then proceeds to step S308.

Next, in step S306, the deformation information calculation unit 123 selects whether or not to calculate on-screen soft object deformation information. The flow proceeds to step S312 if the deformation information calculation unit 123 selects to calculate on-screen soft object deformation information, whereas the flow returns to step S302 if the deformation information calculation unit 123 selects not to calculate on-screen soft object deformation information.

Next, in step S312, the deformation information calculation unit 123 performs picture processing in accordance with the imaging information to generate on-screen soft object deformation information with the deformed area of the on-screen soft object taken into consideration. The flow then proceeds to step S308.

Next, in step S308, the master motion information acquiring unit 110 acquires master motion information and the force information acquiring unit 117 acquires force information. The flow then proceeds to step S309.

Next, in step S309, the force information correcting unit 114 multiplies the force information acquired from the force information acquiring unit 117 and a ratio between the master motion information and one of the on-screen slave motion information and the on-screen soft object deformation information to generate corrected force information that is corrected to on-screen information. The flow then proceeds to step S310. Next, in step S310, the force information presentation unit 115 generates a command value for the master arm 2 in accordance with the corrected force information acquired from the force information correcting unit 114, and then, the master arm 2 presents force to the operator 1.

Effects of Second Embodiment

The deformation information calculation unit 123 calculates deformation information with the deformed area on the screen taken into consideration, the force information correcting unit 114 corrects force information in accordance with how the operator 1 performs a task or the material for the soft object, and the force information presentation unit 115 presents force. This allows the task to be performed accurately.

Third Embodiment

Figure 31:
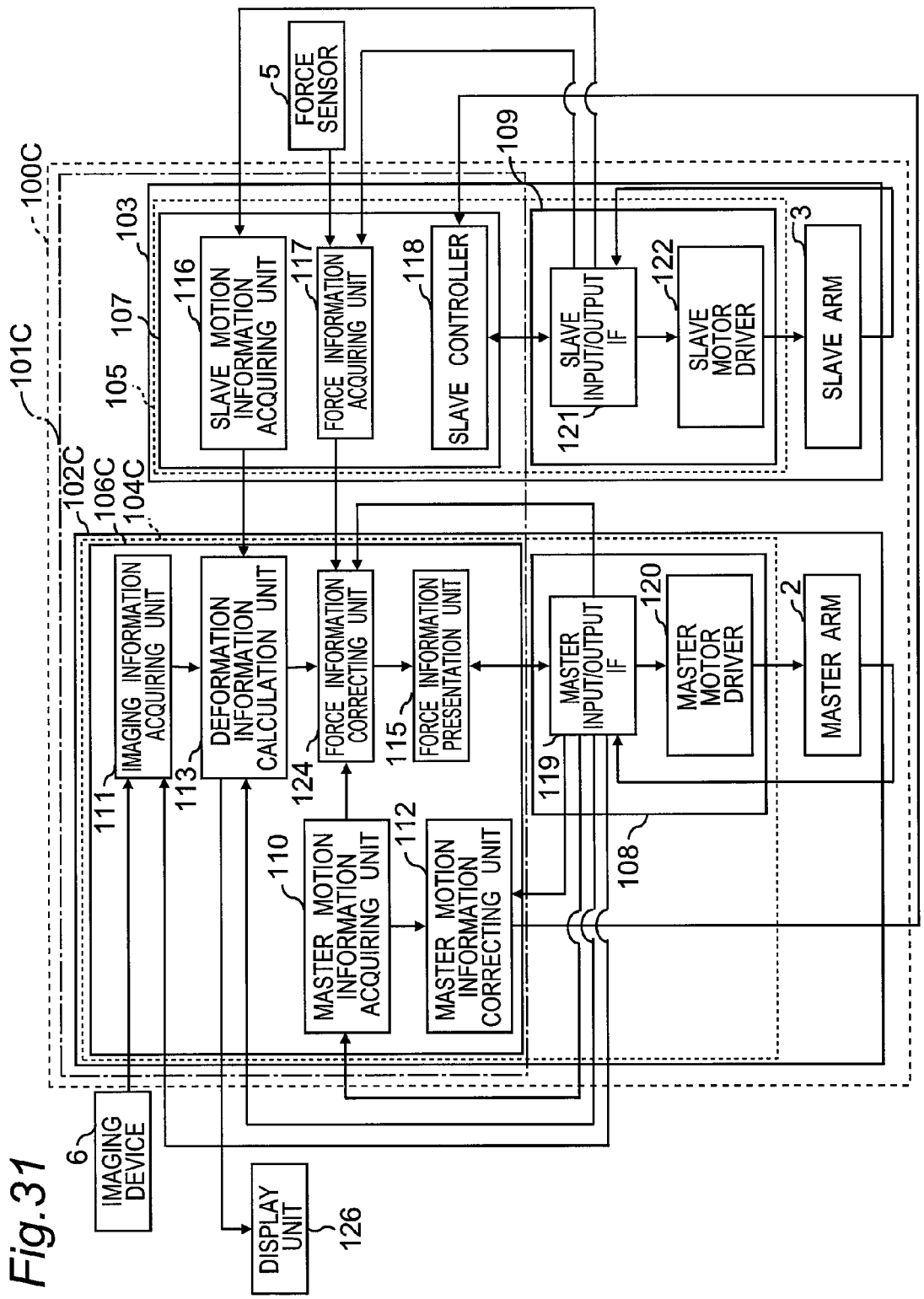
FIG. 31 is a block diagram of a master slave robot according to a third embodiment of the present invention.

Schematically described is a master slave robot 100C including a control apparatus 101C for the master slave robot 100C according to the third embodiment of the present invention. FIG. 31 is a block diagram of the master slave robot 100C according to the third embodiment of the present invention. In a master robot 102C according to the third embodiment of the present invention, the master arm 2, the master peripheral device 108, as well as the master motion information acquiring unit 110, the imaging information acquiring unit 111, the master motion information correcting unit 112, the deformation information calculation unit 113, and the force information presentation unit 115 in a master control apparatus 106C, and the slave robot 103 are configured similarly to those of the first embodiment. These common portions are denoted by the common reference signs and are not described repeatedly, and only different portions are to be detailed below.

(Force Information Correcting Unit 124)

A force information correcting unit 124 replaces the force information correcting unit 114 according to the first embodiment and is included in a control apparatus 104C for the master arm 2. In addition to the functions of the force information correcting unit 114 according to the first embodiment, the force information correcting unit 124 has a function of not correcting force information in a direction of small shift of the slave arm or small deformation of the soft object on the screen.

Figure 32:
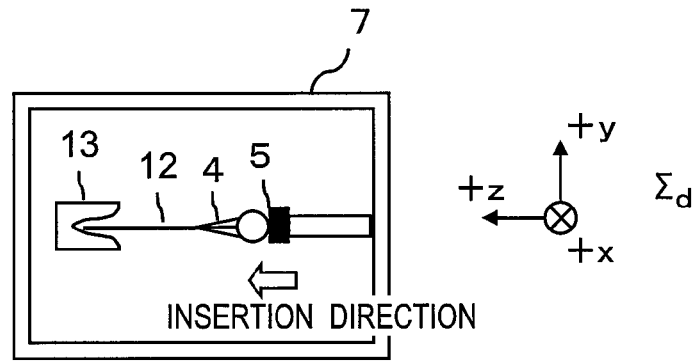
FIG. 32 is an explanatory view of a method of correcting force information in the master slave robot according to the third embodiment of the present invention.

Described with reference to FIG. 32 is how the force information correcting unit 114 according to the first embodiment corrects force information in the example of FIG. 15C. In FIG. 32, the operator 1 performs a task while watching motion mainly along the y axis and the z axis on the screen of the display 7. In this case, motion along the remaining x axis is invisible on the screen. However, when the operator 1 shifts the master arm 2 along the x axis, on-screen slave motion information or on-screen soft object deformation information has a much smaller value than the master motion information. The force information correcting unit 114 accordingly corrects the force information to have a much larger value along the x axis and such corrected force is presented to the operator 1. Force along the axis that is not quite relevant to the task is presented as being larger, so that the operator 1 fails to recognize force along the axes necessary for the task.

The force information correcting unit 124 according to the third embodiment thus does not modify force information with respect to an axis such as the x axis in FIG. 32, along which shift or deformation cannot be checked on the screen.

Figure 33A:
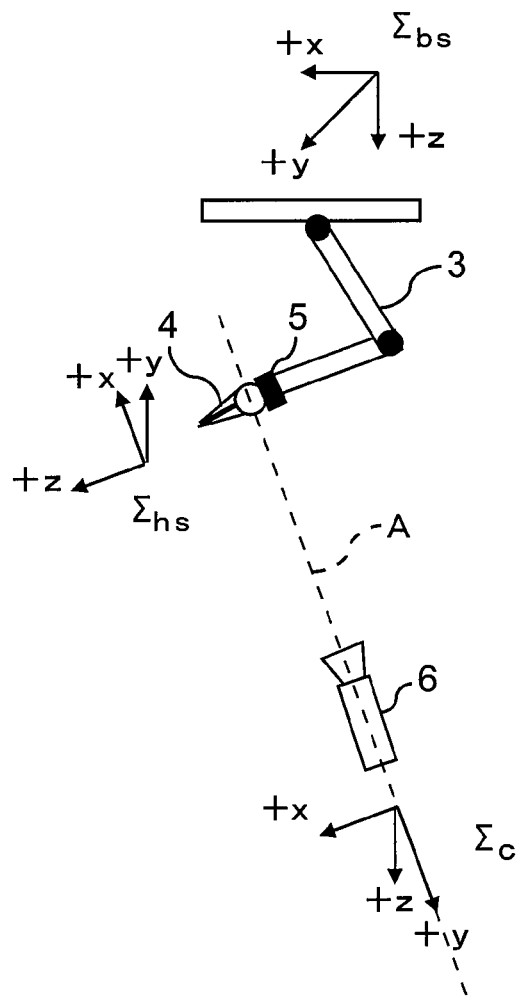
FIG. 33A is an explanatory view of a method of detecting a direction in which force is not corrected in the master slave robot according to the third embodiment of the present invention.
Figure 33B:
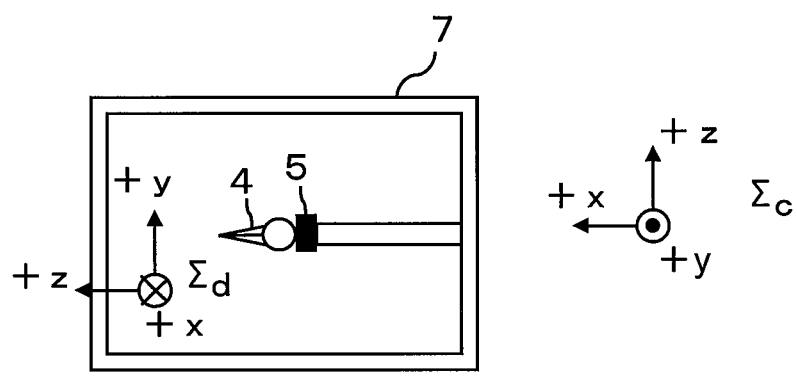
FIG. 33B is an explanatory view of the method of detecting the direction in which the force is not corrected in the master slave robot according to the third embodiment of the present invention.

Described with reference to FIGS. 33A and 33B is how the force information correcting unit 124 detects a direction in which force correcting is not performed. Shift of the slave arm 3 in the imaging direction (along the y axis in the imaging coordinate system $\Sigma_c$) of the imaging device 6 as indicated in FIG. 33A cannot be checked on the screen shown in FIG. 33B. The force information correcting unit 124 thus does not modify force information in an axis direction within a predetermined angle (e.g. 10 degrees) in a hand coordinate system $\Sigma_{hs}$ of the slave arm 3 from the imaging direction of the imaging device 6. In the example of FIGS. 33A and 33B, the force information correcting unit 124 does not modify force information along the x axis in the hand coordinate system $Z_{hs}$ of the slave arm 3. When the force information correcting unit 124 does not modify force information in a direction in which shift or deformation is hardly visible on the screen in this manner, force in a direction in which the task is performed is likely to be transmitted to the operator 1.

<Flowchart>

Figure 34:
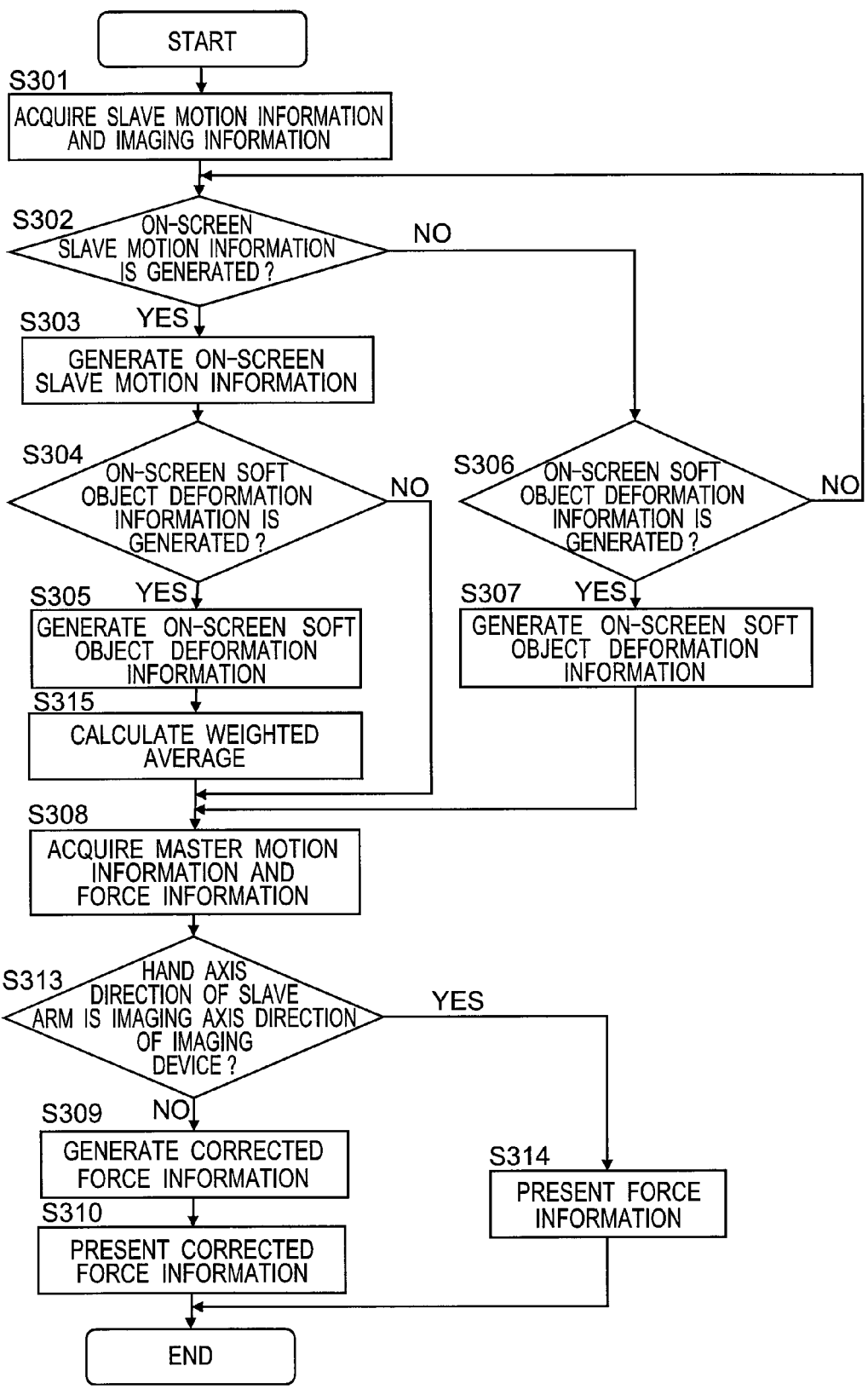
FIG. 34 is a flowchart of a force correction procedure of the master slave robot according to the third embodiment of the present invention.

A manipulation procedure of the master slave robot 100C according to the third embodiment is described with reference to the flowchart in FIG. 34.

An example of the manipulation of the master slave robot 100C according to the third embodiment is similar to the manipulation illustrated in FIG. 25. Described with reference to FIG. 34 are force information acquisition in step S204, corrected force information generation in step S205, and force presentation in step S206 in the flowchart in FIG. 25.

Initially in step S301, the slave motion information acquiring unit 116 acquires slave motion information, and the imaging information acquiring unit 111 acquires imaging information. The flow then proceeds to step S302.

Subsequently in step S302, the deformation information calculation unit 113 selects whether or not to calculate on-screen slave motion information. The flow proceeds to step S303 if the deformation information calculation unit 113 selects to calculate on-screen slave motion information, whereas the flow proceeds to step S306 if the deformation information calculation unit 113 selects not to calculate on-screen slave motion information. According to an example of a determination (selection) reference in step S302, the flow proceeds to step S306 if the deformation information calculation unit 113 determines that the control apparatus 104C for the master arm 2 is capable of performing picture processing, whereas the flow proceeds to step S303 if the deformation information calculation unit 113 determines that the control apparatus 104C is incapable of performing picture processing. According to another example of a determination reference, the flow proceeds to step S303 if the deformation information calculation unit 113 determines that a deformation amount on the screen is small (the deformation amount is smaller than the threshold), whereas the flow proceeds to step S306 if the deformation information calculation unit 113 determines that the deformation amount on the screen is large (the deformation amount is larger than the threshold).

Next, in step S303, the deformation information calculation unit 113 generates on-screen slave motion information serving as motion information on the on-screen slave arm 3 in accordance with the slave motion information and the imaging information. The flow then proceeds to step S304.

Next, in step S304, the deformation information calculation unit 113 selects whether or not to calculate on-screen soft object deformation information. The flow proceeds to step S305 if the deformation information calculation unit 113 selects to calculate on-screen soft object deformation information, whereas the flow proceeds to step S308 if the deformation information calculation unit 113 selects not to calculate on-screen soft object deformation information.

Next, in step S305, the deformation information calculation unit 113 performs picture processing in accordance with the imaging information to generate on-screen soft object deformation information with the deformed area of the on-screen soft object taken into consideration. The flow then proceeds to step S315.

Next, in step S315, the deformation information calculation unit 113 calculates a weighted average between the on-screen slave motion information and the on-screen soft object deformation information to generate the calculated weighted average as deformation information. The flow then proceeds to step S308.

Next, in step S306, the deformation information calculation unit 113 selects whether or not to calculate on-screen soft object deformation information. The flow proceeds to step S307 if the deformation information calculation unit 113 selects to calculate on-screen soft object deformation information, whereas the flow returns to step S302 if the deformation information calculation unit 113 selects not to calculate on-screen soft object deformation information.

Next, in step S307, the deformation information calculation unit 113 performs picture processing in accordance with the imaging information to generate on-screen soft object deformation information with the deformed area of the on-screen soft object taken into consideration. The flow then proceeds to step S308.

Then in step S308, the master motion information acquiring unit 110 acquires master motion information and the force information acquiring unit 117 acquires force information. The flow then proceeds to step S313.

Next, in step S313, in the force information correcting unit 124, the flow proceeds to step S314 as to any axis in the hand coordinate system of the slave arm 3 being within a predetermined angle (e.g. 10 degrees) from the imaging direction of the imaging device 6, whereas the flow proceeds to step S309 as to any axis being not within the predetermined angle.

Next, in step S314, as to the axis direction within the predetermined angle (e.g. 10 degrees), the force information presentation unit 115 generates a command value for the master arm 2 in accordance with the force information acquired from the force information acquiring unit 117 by way of the force information correcting unit 124 and uncorrected, and then, the master arm 2 presents force to the operator 1.

Next, in step S309, as to the axis direction not within the predetermined angle, the force information correcting unit 124 multiplies the force information acquired from the force information acquiring unit 117 and a ratio between the master motion information and one of the on-screen slave motion information and the on-screen soft object deformation information to generate corrected force information that is corrected to on-screen information. The flow then proceeds to step S310.

Next, in step S310, as to the axis direction not within the predetermined angle, the force information presentation unit 115 generates a command value for the master arm 2 in accordance with the corrected force information acquired from the force information correcting unit 114, and then, the master arm 2 presents force to the operator 1.

Effects of Third Embodiment

The force information correcting unit 114 does not modify force information along an axis hard to be imaged by the imaging device, so that the force information presentation unit 115 is capable of appropriately presenting, to the operator 1, force along an axis in which force presentation is necessary. This allows the task to be performed accurately.

Fourth Embodiment

Figure 35:
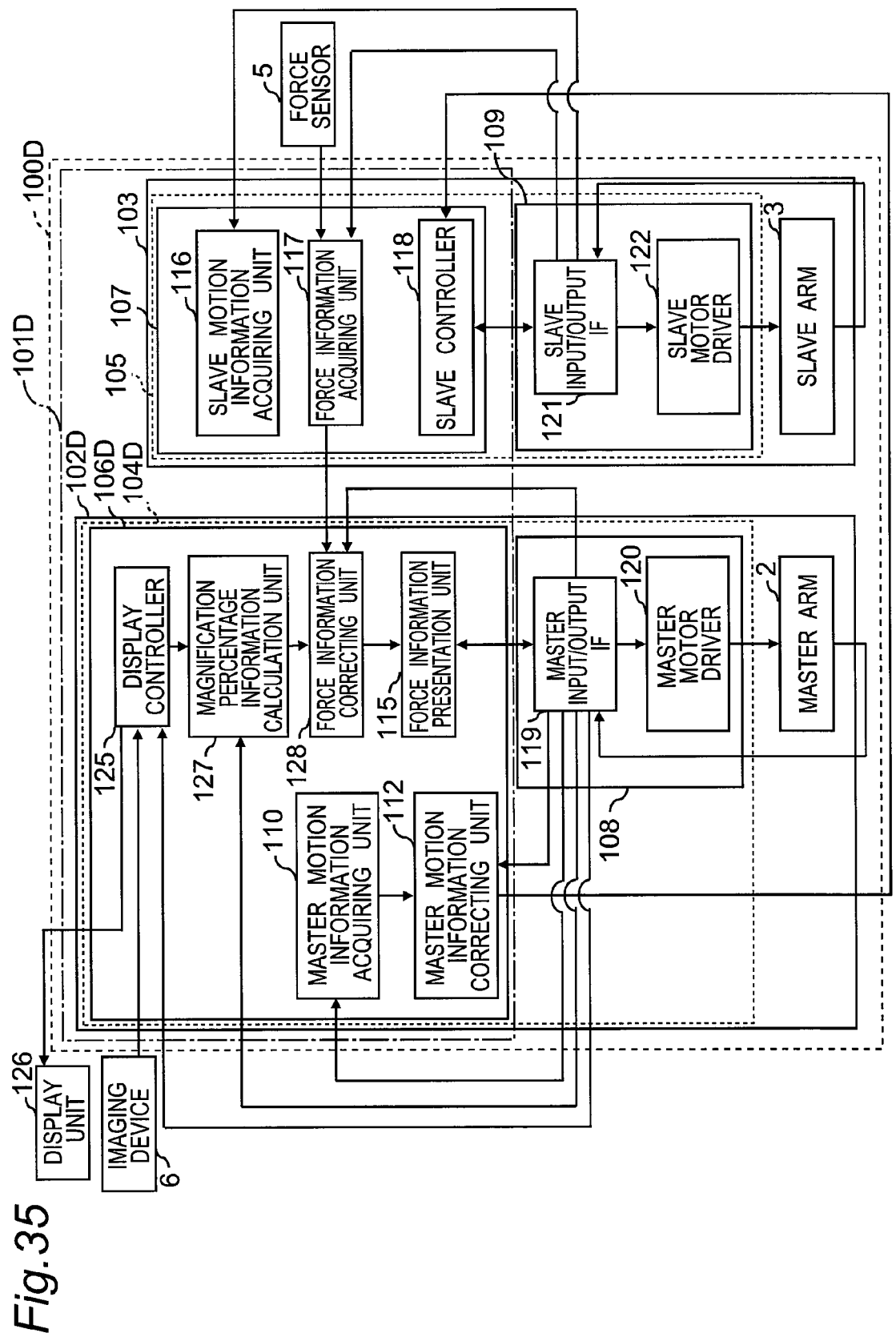
FIG. 35 is a block diagram of a master slave robot according to a fourth embodiment of the present invention.

Schematically described is a master slave robot 100D including a control apparatus 101D for the master slave robot 100D according to the fourth embodiment of the present invention. FIG. 35 is a block diagram of the master slave robot 100D according to the fourth embodiment of the present invention. In a master robot 102D according to the fourth embodiment of the present invention, the master arm 2, the master peripheral device 108, as well as the master motion information acquiring unit 110, the master motion information correcting unit 112, and the force information presentation unit 115 in a master control apparatus 106D, and the slave robot 103 are configured similarly to those of the first embodiment. These common portions are denoted by the common reference signs and are not described repeatedly, and only different portions are to be detailed below.

(Display Controller 125)

A display controller 125 receives imaged picture information, magnification percentage information, and imaging device position information from the imaging device 6 and time information from the timer incorporated in the master input/output IF 119. The magnification percentage information acquired by the display controller 125, the imaging device position information, and the time information, other than the imaged picture information being exemplified are similar to those of FIG. 9. Imaged picture information indicates a picture itself projected on the display 7. Imaging information includes imaged picture information, magnification percentage information, and imaging device position information.

The display controller 125 enlarges, reduces, or trims an imaged picture acquired from the imaging device and transmits to the display unit 126. The display controller 125 updates, as imaged picture information, the imaged picture to be transmitted to the display unit 126. The display controller 125 multiplies a magnification percentage upon enlargement or reduction and the magnification percentage information acquired from the imaging device 6 to update the magnification percentage information. The display controller 125 transmits, to a magnification percentage information calculation unit 127, the imaged picture information and the magnification percentage information thus obtained, the imaging device position information acquired from the imaging device 6, and the time information from the timer incorporated in the master input/output IF 119.

(Display Unit 126)

The display unit 126 receives imaged picture information from the display controller 125. The display unit 126 causes the received imaged picture information to be projected on the display 7.

(Magnification Percentage Information Calculation Unit 127)

The magnification percentage information calculation unit 127 receives, from the display controller 125, imaged picture information, magnification percentage information, imaging device position information, and time information. The magnification percentage information calculation unit 127 transmits the magnification percentage information and the time information thus received to a force information correcting unit 128.

As to the magnification percentage information, the magnification percentage information calculation unit 127 sets to one, a magnification percentage for a case where a shift amount of the slave arm 2 directly watched by the operator 1 is equal to a shift amount of the slave arm 2 on the screen of the display 7 when the slave arm 2 is imaged from the location of the imaging device 6.

As described above, the magnification percentage information calculation unit 127 sets to one the magnification percentage as a reference in the case where the shift amount of the actual slave arm 2 is equal to the shift amount of the on-screen slave arm 2. The magnification percentage information calculation unit 127 is alternatively capable of setting to one a different magnification percentage as a reference. For example, when the magnification percentage information calculation unit 127 sets the most decreased magnification percentage to one, it is possible to induce the operator to quite effectively apply large force to a soft object that is soft and largely deformed. In contrast, when the magnification percentage information calculation unit 127 sets the most increased magnification percentage to one, it is possible to effectively prevent too large force from being applied to a soft object that is not soft and less likely to be deformed. It is possible to change the reference in accordance with a task or a target object in these manners.

The magnification percentage information calculation unit 127 is capable of changing the reference of magnification percentage information as described above, and updates the magnification percentage information in accordance with the changed reference if applicable.

(Force Information Correcting Unit 128)

The force information correcting unit 128 replaces the force information correcting unit 114 according to the first embodiment and is included in a control apparatus 104D for the master arm 2. In addition to the functions of the force information correcting unit 114 according to the first embodiment, the force information correcting unit 128 has a function of correcting force information in accordance with magnification percentage information on the screen.

The force information correcting unit 128 receives magnification percentage information and time information from the magnification percentage information calculation unit 127, as well as force information and time information from the force information acquiring unit 117. The force information correcting unit 128 corrects the force information thus received in accordance with the magnification percentage information. A correcting method of the force information correcting unit 128 is described below. Assuming that the magnification percentage information has a value m, the force information correcting unit 128 corrects the force information thus acquired to 1/m. When the force information correcting unit 128 corrects in this manner, force information can be decreased in a case of enlarging for projection, whereas the force information can be increased in a case of reducing for projection.

(Relationship Between First Embodiment and Fourth Embodiment)

Also described is a difference between use of deformation information in the first embodiment and use of magnification percentage information in the fourth embodiment. It is necessary to perform picture processing in order to calculate on-screen soft object deformation information as the deformation information according to the first embodiment. If the magnification percentage information calculation unit 127 determines that the control apparatus 104D for the master arm 2 is incapable of performing picture processing, the force information correcting unit 128 uses the magnification percentage information in the fourth embodiment in place of deformation information without complicated processing. The force information correcting unit 128 according to the fourth embodiment is capable of correcting force information without using slave motion information or master motion information. It is thus possible to use magnification percentage information in place of deformation information with no need for any complicated system.

Other than the above selection guideline, if the deformation information calculation unit 113 sets a threshold (e.g. 1 mm) to calculate a deformation amount in the first embodiment and determines that the deformation amount does not exceed the threshold, the deformation information calculation unit 113 is capable of using magnification percentage information in the fourth embodiment. By selecting in this manner, it is possible to use magnification percentage information for a location where a deformation amount is hard to be measured. It is still alternatively possible to set the threshold and perform automatic selection.

Similarly to the foregoing embodiments, the display unit 126 in the present embodiment also receives imaged picture information transmitted from the deformation information calculation unit 113. The display unit 126 causes the received imaged picture information to be projected on the display 7.

<Flowchart>

Figure 36:
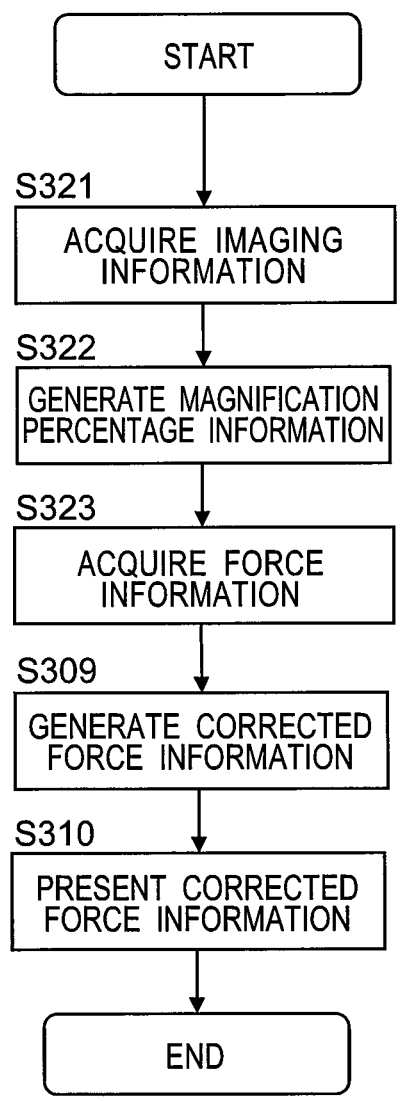
FIG. 36 is a flowchart of a force correction procedure of the master slave robot according to the fourth embodiment of the present invention.

A manipulation procedure of the master slave robot 100D according to the fourth embodiment is described with reference to the flowchart in FIG. 36.

An example of the manipulation of the master slave robot 100D according to the fourth embodiment is similar to the manipulation illustrated in FIG. 25. Described with reference to FIG. 36 are force information acquisition in step S204, corrected force information generation in step S205, and force presentation in step S206 in the flowchart in FIG. 25.

Initially in step S321, the display controller 125 acquires imaging information, and the flow then proceeds to step S322.

Subsequently in step S322, the magnification percentage information calculation unit 127 generates magnification percentage information in accordance with the magnification percentage information acquired from the display controller 125. The flow then proceeds to step S323.

Next, in step S323, the force information acquiring unit 117 acquires force information, and the flow then proceeds to step S309.

Next, in step S309, the force information correcting unit 128 corrects the force information acquired from the force information acquiring unit 117 to generate corrected force information in accordance with one of magnification percentage information and deformation information. The flow then proceeds to step S310.

Next, in step S310, the force information presentation unit 115 generates a command value for the master arm 2 in accordance with the corrected force information acquired from the force information correcting unit 128, and then, the master arm 2 presents force to the operator 1.

Effects of Fourth Embodiment

Force information can be corrected by the force information correcting unit 128 of the control apparatus 101D in the master slave robot 100D having a simple configuration, with no need for complicated processing such as picture processing. The force information correcting unit 128 is capable of appropriately correcting force information even when deformation information is hardly visible on the screen.

Either one of the master robot 102 and the slave robot 103 can include each constituent element in the control apparatuses 101, 101B, 101C, and 101D for the master slave robots 100, 100B, 100C, and 100D according to the respective embodiments of the present invention. In other words, the slave control apparatus 107 can include any constituent element in the master control apparatus 106 106B, 106C, or 106D for the master robot 102, while the master control apparatus 106, 106B, 106C, or 106D can include any constituent element in the slave control apparatus 107.

Modification Examples

In the first or second embodiment, when the operator 1 manipulating the master robot 102 or 102B operates the slave robot 103 while watching the screen, fed back force is changed in accordance with a deformation amount of a soft object projected on the screen. The force information correcting unit 114 corrects the fed back force using a value obtained by multiplying the ratio ($d_b/d_d$) and the gain $\alpha$ in this case.

When performing a task, the operator 1 typically senses force in different manners depending on how a target article is projected on the screen. However, in a same insertion task, quality variation is suppressed by inserting with equal force even when the target article is projected in a different manner. Different operators 1 sense force differently also due to personal differences.

It is thus effective to perform preliminary calibration regarding how differently the operator 1 senses force in the same task, in order to modify personal force differences. Performing such calibration corresponds to determining the gain $\alpha$ in the first or second embodiment of the present invention.

Figure 37:
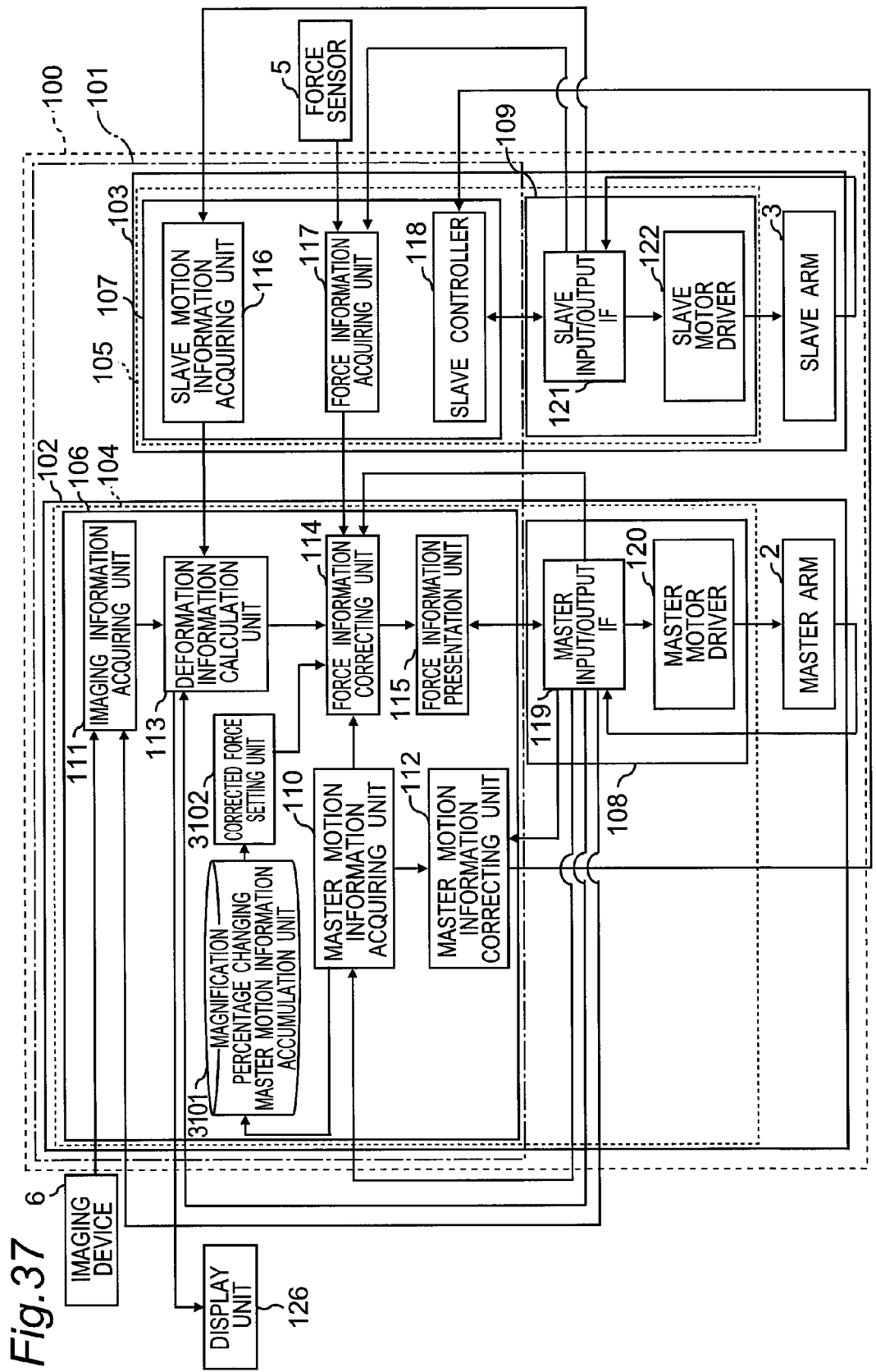
FIG. 37 is a block diagram of a master slave robot according to a modification example of the first or second embodiment of the present invention.

FIG. 37 exemplifies a configuration of a control apparatus for a master slave robot. The control apparatus for the master slave robot shown in FIG. 37 is configured by adding a magnification percentage changing master information accumulation unit 3101 and a corrected force setting unit 3102 to the control apparatus 101 for the master slave robot 100 in FIG. 2. Similarly to the foregoing embodiments, the display unit 126 in the present modification example also receives imaged picture information transmitted from the deformation information calculation unit 113. The display unit 126 causes the received imaged picture information to be projected on the display 7.

The magnification percentage changing master information accumulation unit 3101 accumulates, for each of tasks having different magnification percentages, master motion information (orientation information acquired by the master motion information acquiring unit 110) for a case where pictures of different magnification percentages are presented to the operator 1 for a same task. The corrected force setting unit 3102 sets force information that is calculated to be corrected by the force information correcting unit 114 from a plurality of pieces of master motion information accumulated in the magnification percentage changing master information accumulation unit 3101.

Figure 13:
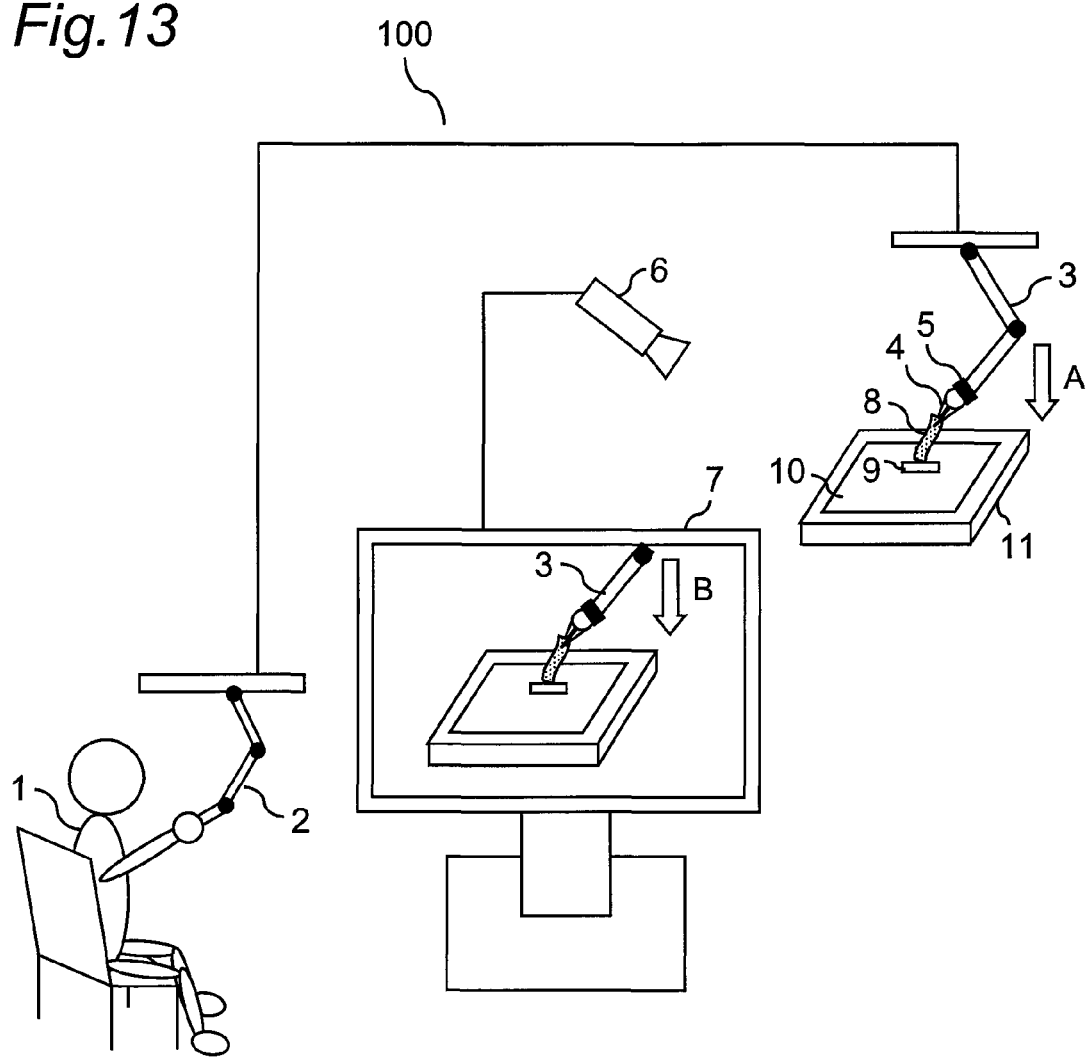
FIG. 13 is an explanatory view of calibration of magnification percentage information in the master slave robot according to the first embodiment of the present invention.

In an exemplary case where the master slave robot 100 shown in FIG. 13 performs a task, a difference in force applied to the slave arm 3 is preliminarily measured between the states of FIG. 3A and FIG. 3B. Deformation information on the imaged target article is small in a motion picture including a wide region as in FIG. 3A, so that the operator applies large force to the slave arm 3. In contrast, deformation information on the imaged target article is large in an enlarged motion picture as in FIG. 3B, so that the operator 1 tends to suppress motion of the slave arm 3. In this manner, the same operator 1 possibly performs the same task with different force when the projected motion picture has a different magnification percentage. This leads to quality variation. In view of this problem, a difference in force applied by the operator 1 is preliminarily measured for each motion picture having a different magnification percentage, and the corrected force setting unit 3102 corrects the difference. For example, when a motion picture includes a wide region as in FIG. 3A, average force applied to the target article is 4.8 N (see FIG. 3C). In contrast, when a detailed motion picture is projected as in FIG. 3B, average force applied to the target article is 2.3 N (see FIG. 3D). The corrected force setting unit 3102 thus sets force to be fed back to the master arm 2 to be smaller when the detailed motion picture is projected, so as not to cause the difference of 2.5 N (=4.8 N−2.3 N). In this case, if the detailed motion picture is projected, the operator 1 determines that a contact degree is small and tends to contact with larger force. Force applied to the master arm 2 is corrected in this manner so as not to cause variation in task due to the difference in projected motion picture.

In the above example, force applied to the slave arm 3 is measured for each of the motion pictures projected with two kinds of magnification percentages. In order for more detailed setting, motion pictures with three or more magnification percentages can be projected so as to achieve more accurate correction.

Presented in the above example are the motion pictures with different magnification percentages. The operator 1 possibly changes force in the imaging direction. By measuring force applied by the operator 1 in each imaging direction, it is possible to modify force in the imaging direction.

There are some more correction methods as follows.

For example, force can be corrected so as to be equally applied to the slave arm with a different magnification percentage.

Specifically, in the control apparatus 101 for the master slave robot 100, the magnification percentage changing master information accumulation unit 3101 accumulates force information acquired by the force information acquiring unit 117 that acquires information on force externally applied to the slave arm 3 with a different magnification percentage. The corrected force setting unit 3102 then sets corrected force so as to approximate the force information when a picture having a different magnification percentage is projected.

Figure 38:
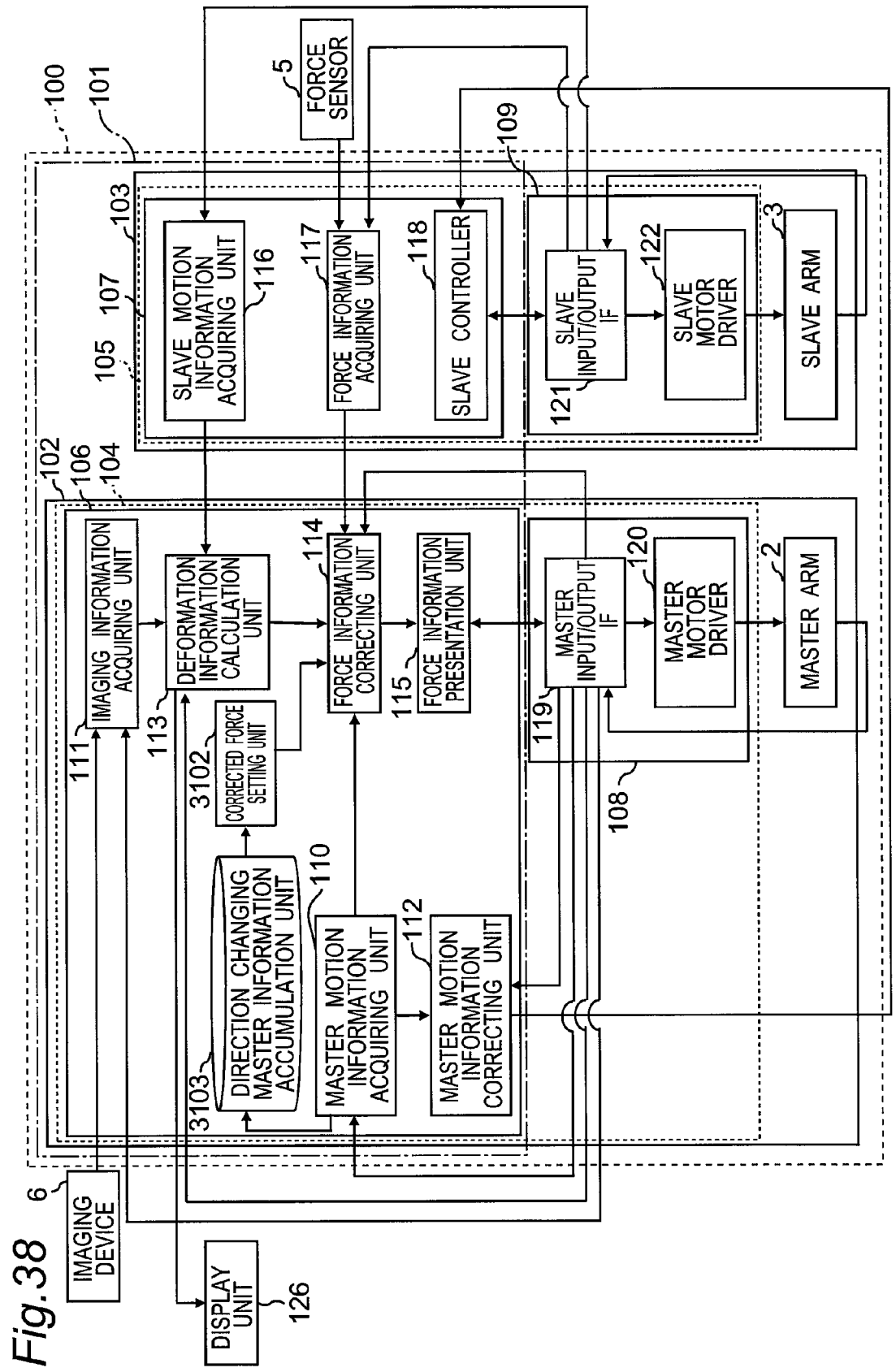
FIG. 38 is a block diagram of a master slave robot according to another modification example of the first or second embodiment of the present invention.

Corrected force can be alternatively set in accordance with a picture imaged in a different direction. Description is given with reference to the block diagram in FIG. 38. Similarly to the foregoing embodiments, the display unit 126 in the present modification example also receives imaged picture information transmitted from the deformation information calculation unit 113. The display unit 126 causes the received imaged picture information to be projected on the display 7.

Specifically, the control apparatus 101 additionally includes a direction changing master information accumulation unit 3103 that accumulates, for each task in a different direction, orientation information acquired by the master motion information acquiring unit 110 when the operator 1 performs the same task and a picture imaged in a different direction is projected. The corrected force setting unit 3102 calculates and sets corrected force information of the force information correcting unit 114 in accordance with the information accumulated in the direction changing master information accumulation unit 3103.

Furthermore, force with a different direction can be corrected so as to be equally applied to the slave arm.

Specifically, the control apparatus 101 for the master slave robot 100 further includes the direction changing master information accumulation unit 3103. The direction changing master information accumulation unit 3103 accumulates force information acquired by the force information acquiring unit 117 that acquires information on force externally applied to the slave arm 3 with a different direction. The corrected force setting unit 3102 then sets corrected force so as to approximate the force information when a picture in a different direction is projected.

Though the present disclosure has been described above based on the above first to fourth embodiments and modification examples, the present disclosure should not be limited to the above-described first to fourth embodiments and modification examples. For example, the present disclosure also includes the following cases.

Part or entirety of each of the control apparatuses 101, 101B, 101C, and 101D for the master slave robots 100, 100B, 100C, and 100D is actually a computer system that includes, for example, a microprocessor, ROM, RAM, hard disk unit, display unit, keyboard, mouse, and the like. A computer program is stored on the RAM or the hard disk unit. Functions of each of the apparatuses can be achieved by the microprocessor operating according to the computer program. The computer program mentioned here is a combination of a plurality of instruction codes that indicate commands to a computer for achieving predetermined functions.

For example, each component can be implemented as a result that a program executing section (part/unit) such as a CPU reads and executes software programs recorded in a recording medium such as a hard disk or semiconductor memory. Here, software that implements a part or entirety of the apparatus according to each of the above-mentioned embodiments or the modification examples is a following program. That is to say, this program has a computer execute the sections (parts/units) defined in claims. The program has a computer execute the units/steps defined in claims. That is, such a program is a control program for a master slave robot that comprises a slave arm that performs a task to a soft object and a master arm manipulated by a person who remotely manipulates the slave arm, the person performing the task using the master slave robot while watching a state of the task imaged by an imaging device and displayed on a display unit, the control program causing a computer to execute steps of:

acquiring, at a force information acquiring unit, information on force externally applied to the slave arm;

acquiring, at a display information acquiring unit, magnification percentage information at the display unit that displays the task;

correcting the force information acquired from the force information acquiring unit to be smaller as the magnification percentage information acquired from the display information acquiring unit is larger, to generate corrected force information at a force information correcting unit; and presenting, at a force information presentation unit to the master arm, the corrected force information generated by the force information correcting unit.

In addition, it may be possible to execute the program by downloading it from a server or reading it from a predetermined storage medium (an optical disc such as a CD-ROM, a magnetic disc, a semiconductor memory, or the like).

Further, one or more computers can be used to execute the program. That is, centralized processing or distributed processing can be performed.

By properly combining the arbitrary embodiment(s) or modification example(s) of the aforementioned various embodiments and modification examples, the effects possessed by the embodiment(s) or modification example(s) can be produced.

The present invention is useful as a control apparatus and a control method for a master slave robot, a robot, a control program for the master slave robot, and an integrated electronic circuit for control of the master slave robot, in each of which the master slave robot is capable of presenting force in accordance with a picture watched by an operator and is applicable for industrial use, domestic use, medical use, or the like.

The entire disclosure of Japanese Patent Application No. 2013-131632 filed on Jun. 24, 2013, including specification, claims, drawings, and summary are incorporated herein by reference in its entirety.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. A control apparatus for a master slave robot that comprises a slave arm that performs a task to an object and a master arm configured to be manipulated such that the slave arm can be remotely manipulated, the task being performed using the master slave robot while a state of the task imaged by an imaging device is displayed on a screen of a display unit, the control apparatus comprising:

a force information acquiring unit that acquires information on force externally applied to the slave arm;

a display information acquiring unit that acquires magnification percentage information at the display unit that displays the task, and, based on on-screen information, adjusts a magnification percentage of the imaged state of the task;

a force information correcting unit that corrects the force information acquired from the force information acquiring unit according to the magnification percentage information acquired from the display information acquiring unit, to generate corrected force information; and a force information presentation unit that presents, to the master arm, the corrected force information generated by the force information correcting unit, wherein a first force smaller than the force externally applied to the slave arm is presented as the generated corrected force information when the magnification percentage is adjusted to an enlarged magnification percentage.

2. The control apparatus for the master slave robot according to claim 1, wherein the display information acquiring unit functions as a deformation information calculation unit that calculates, as the magnification percentage information, deformation information on the object deformed by the task of the slave arm on the display unit, the on-screen information including the deformation information.

3. The control apparatus for the master slave robot according to claim 2, wherein the display information acquiring unit calculates and uses a length of a deformed range of the object, as the deformation information on the object deformed by the task of the slave arm on the display unit.

4. The control apparatus for the master slave robot according to claim 2, wherein the display information acquiring unit calculates and uses an area of a deformed range of the object, as the deformation information on the object deformed by the task of the slave arm on the display unit.

5. The control apparatus for the master slave robot according to claim 2, further comprising:
a master motion information acquiring unit that acquires master motion information including at least one of a position, an orientation, a velocity, and an angular velocity of the master arm, wherein
the force information correcting unit:
calculates a shift amount ($d_b$) of the master arm from the master motion information;
acquires a deformation amount ($d_d$) of the object calculated by the deformation information calculation unit;
divides the shift amount ($d_b$) by the deformation amount ($d_d$); and
multiplies a division result ($d_b/d_d$) by a correction coefficient and the force information to generate the corrected force information.

6. The control apparatus for the master slave robot according to claim 3, further comprising:
a master motion information acquiring unit that acquires master motion information including at least one of a position, an orientation, a velocity, and an angular velocity of the master arm, wherein
the force information correcting unit:
calculates a shift amount ($d_b$) of the master arm from the master motion information;
acquires a deformation amount ($d_d$) of the object calculated by the deformation information calculation unit;
divides the shift amount ($d_b$) by the deformation amount ($d_d$); and
multiplies a division result ($d_b/d_d$) by a correction coefficient and the force information to generate the corrected force information.

7. The control apparatus for the master slave robot according to claim 4, further comprising:
a master motion information acquiring unit that acquires master motion information including at least one of a position, an orientation, a velocity, and an angular velocity of the master arm, wherein
the force information correcting unit:
calculates a shift amount ($d_b$) of the master arm from the master motion information;
acquires a deformation amount ($d_d$) of the object calculated by the deformation information calculation unit;
divides the shift amount ($d_b$) by the deformation amount ($d_d$); and
multiplies a division result ($d_b/d_d$) by a correction coefficient and the force information to generate the corrected force information.

8. The control apparatus for the master slave robot according to claim 1, wherein the force information correcting unit determines a magnitude as a reference of each of the magnification percentage information and the force information upon correcting the force information.

9. The control apparatus for the master slave robot according to claim 1, wherein the force information correcting unit changes a correction amount in accordance with a softness of the object.

10. The control apparatus for the master slave robot according to claim 1, wherein, when correcting the force information acquired from the force information acquiring unit, the force information correcting unit corrects a magnitude of the force information, or shortens an update period of the force information to generate the corrected force information.

11. A robot comprising:
the control apparatus for a master slave robot according to claim 1; and the master slave robot.

12. A method of controlling a master slave robot that comprises a slave arm that performs a task to an object and manipulating a master arm such that the slave arm can be remotely manipulated, performing the task using the master slave robot while a state of the task imaged by an imaging device is displayed on a screen of a display unit,
the method comprising:
acquiring, at a force information acquiring unit, information on force externally applied to the slave arm;
acquiring, at a display information acquiring unit, magnification percentage information at the display unit that displays the task, and, based on on-screen information, adjusting a magnification percentage of the imaged state of the task;
correcting the force information acquired from the force information acquiring unit according to the magnification percentage information acquired from the display information acquiring unit, to generate corrected force information at a force information correcting unit; and
presenting, at a force information presentation unit to the master arm, the corrected force information generated by the force information correcting unit, wherein
a first force smaller than the force externally applied to the slave arm is presented as the generated corrected force information when the magnification percentage is adjusted to an enlarged magnification percentage.

13. A non-transitory computer-readable recording medium including a control program for a master slave robot that comprises a slave arm that performs a task to an object and manipulating a master arm such that the slave arm can be remotely manipulated, performing the task using the master slave robot while a state of the task imaged by an imaging device is displayed on a screen of a display unit,
the control program causing a computer to execute steps of:
acquiring, at a force information acquiring unit, information on force externally applied to the slave arm;
acquiring, at a display information acquiring unit, magnification percentage information at the display unit that displays the task, and, based on on-screen information, adjusting a magnification percentage of the imaged state of the task;
correcting the force information acquired from the force information acquiring unit according to the magnification percentage information acquired from the display information acquiring unit, to generate corrected force information at a force information correcting unit; and
presenting, at a force information presentation unit to the master arm, the corrected force information generated by the force information correcting unit, wherein
a first force smaller than the force externally applied to the slave arm is presented as the generated corrected force information when the magnification percentage is adjusted to an enlarged magnification percentage.

14. An integrated electronic circuit for control of a master slave robot that comprises a slave arm that performs a task to an object and a master arm configured to be manipulated such that the slave arm can be remotely manipulated, the task being performed using the master slave robot while a state of the task imaged by an imaging device is displayed on a screen of a display unit, the integrated electronic circuit comprising:

a force information acquiring unit that acquires information on force externally applied to the slave arm;

a display information acquiring unit that acquires magnification percentage information at the display unit that displays the task, and, based on on-screen information, adjusts a magnification percentage of the imaged state of the task;

a force information correcting unit that corrects the force information acquired from the force information acquiring unit according to the magnification percentage information acquired from the display information acquiring unit, to generate corrected force information; and a force information presentation unit that presents, to the master arm, the corrected force information generated by the force information correcting unit, wherein a first force smaller than the force externally applied to the slave arm is presented as the generated corrected force information when the magnification percentage is adjusted to an enlarged magnification percentage.

15. The control apparatus for the master slave robot according to claim 1, further comprising:

a slave motion information acquiring unit that acquires slave motion information, and transmits the slave motion information to the display information acquiring unit, wherein the on-screen information includes the slave motion information.

16. The control apparatus for the master slave robot according to claim 1, wherein a second force larger than the force externally applied to the slave arm is presented as the generated corrected force information when the magnification percentage is adjusted to a reduced magnification percentage.

* * * * *